United States Patent [19]
Fujioka et al.

[11] Patent Number: 5,946,523
[45] Date of Patent: Aug. 31, 1999

[54] PRINTING APPARATUS

[75] Inventors: Hidenori Fujioka; Kazuhiko Hamazoe; Masakazu Kinoshita; Tsutomu Kawai; Masahiro Wanou; Youji Houki; Kaneastu Uchiyama; Kouichi Kobayashi; Takeo Kojima; Morihisa Kawahara; Shinichirou Yamamoto; Masakazu Kanaka; Hirofumi Nakayasu; Tsutomu Nagatomi, all of Kawasaki, Japan

[73] Assignee: Fujitsu Limited, Kawasaki, Japan

[21] Appl. No.: 09/041,006

[22] Filed: Mar. 12, 1998

[30] Foreign Application Priority Data

Jun. 5, 1997 [JP] Japan .................................. 9-147646

[51] Int. Cl.$^6$ .................................................. G03G 15/00
[52] U.S. Cl. .............................. 399/49; 347/139; 399/303
[58] Field of Search ................................. 399/49, 58, 60, 399/46, 303; 347/139

[56] References Cited

U.S. PATENT DOCUMENTS

| | | |
|---|---|---|
| 4,348,099 | 9/1982 | Fantozzi ................................. 399/49 X |
| 5,253,018 | 10/1993 | Takeuchi et al. ......................... 399/49 |
| 5,307,119 | 4/1994 | Folkins et al. ............................ 399/46 |
| 5,386,276 | 1/1995 | Swales et al. ......................... 399/60 X |
| 5,483,328 | 1/1996 | Kawasaki et al. ........................ 399/49 |
| 5,724,627 | 3/1998 | Okuno et al. ......................... 399/49 X |
| 5,854,958 | 12/1998 | Tanimoto et al. ........................ 399/49 |

*Primary Examiner*—S. Lee
*Attorney, Agent, or Firm*—Armstrong, Westerman, Hattori, McLeland & Naughton

[57] ABSTRACT

A toner developing quantity detection unit operates a plurality of electrostatic recording units to transfer Y, M, C and K color component toner marks onto a belt. A toner developing quantity correction unit detects toner developing quantities per unit area of color toners on the basis of detection signals of the color component toner marks on the belt optically detected by a sensor. The toner developing quantity correction unit corrects the toner developing quantities so as to allow the toner consuming quantities of the plurality of electrostatic recording units to be substantially the same level, on the basis of the thus detected toner developing quantities.

13 Claims, 27 Drawing Sheets

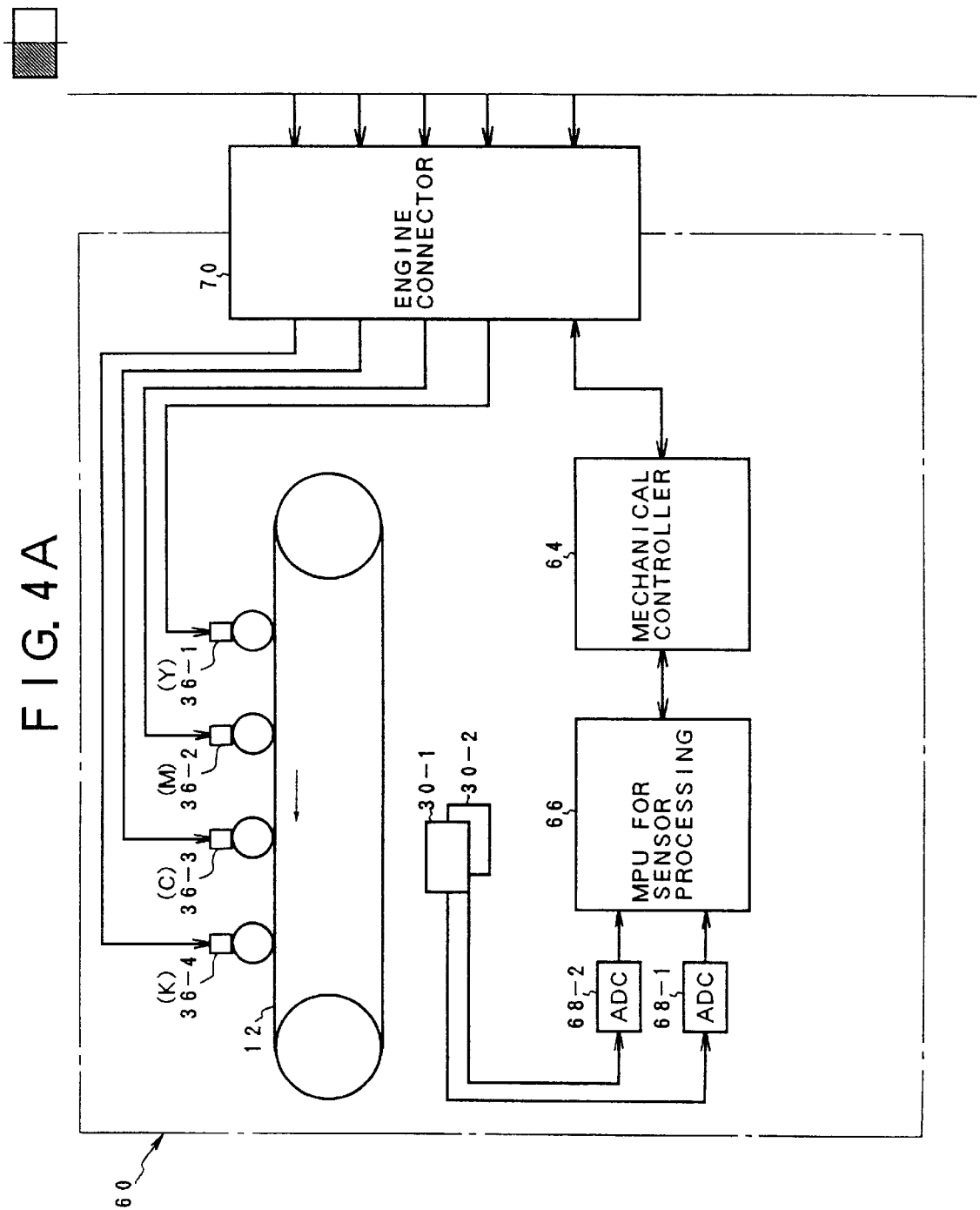

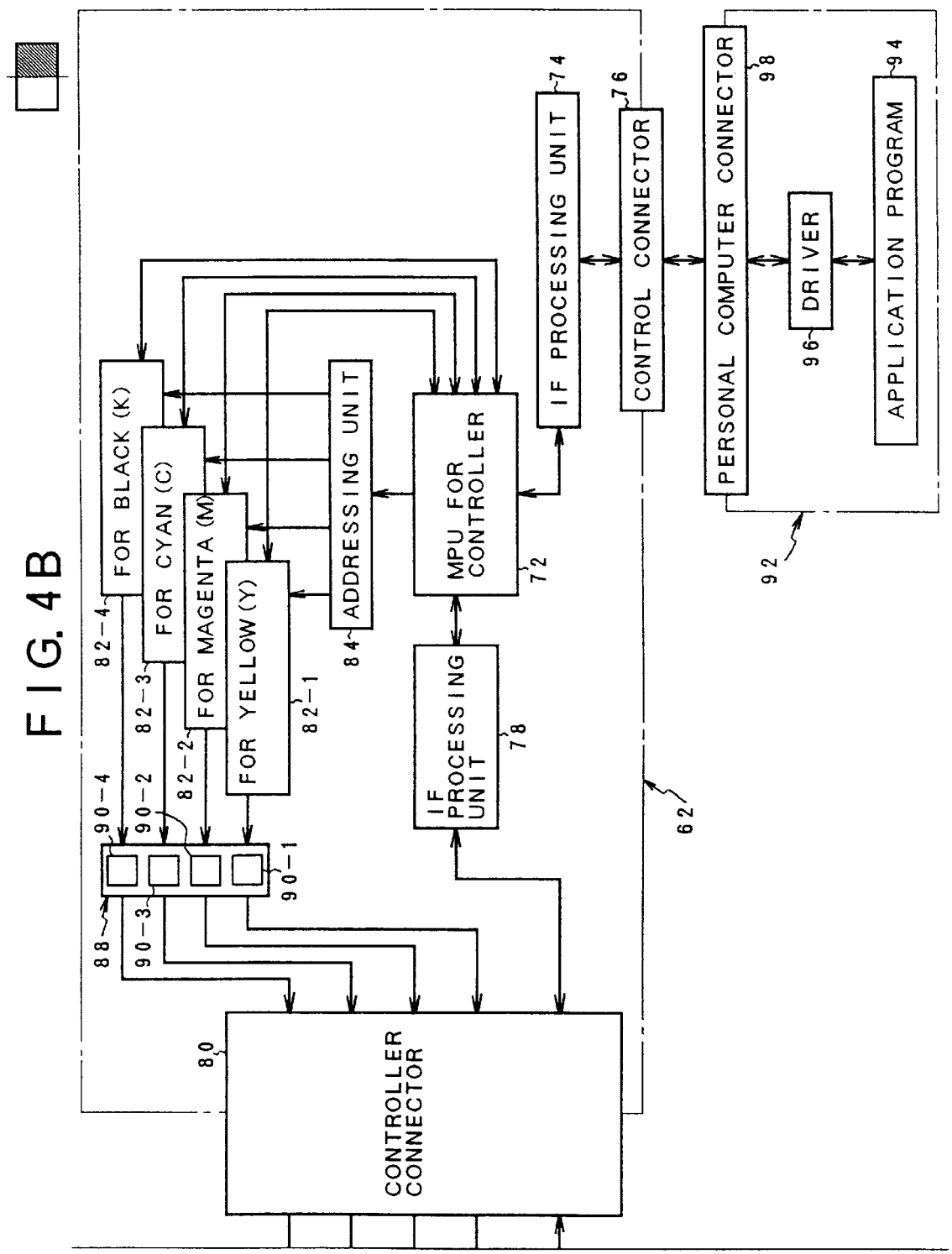

FIG. 14A LED LIGHT EMITTING POWER

FIG. 14B LED LIGHT EMITTING TIMING

FIG. 14C DEVELOPING ROLLER POTENTIAL

F I G. 2 3
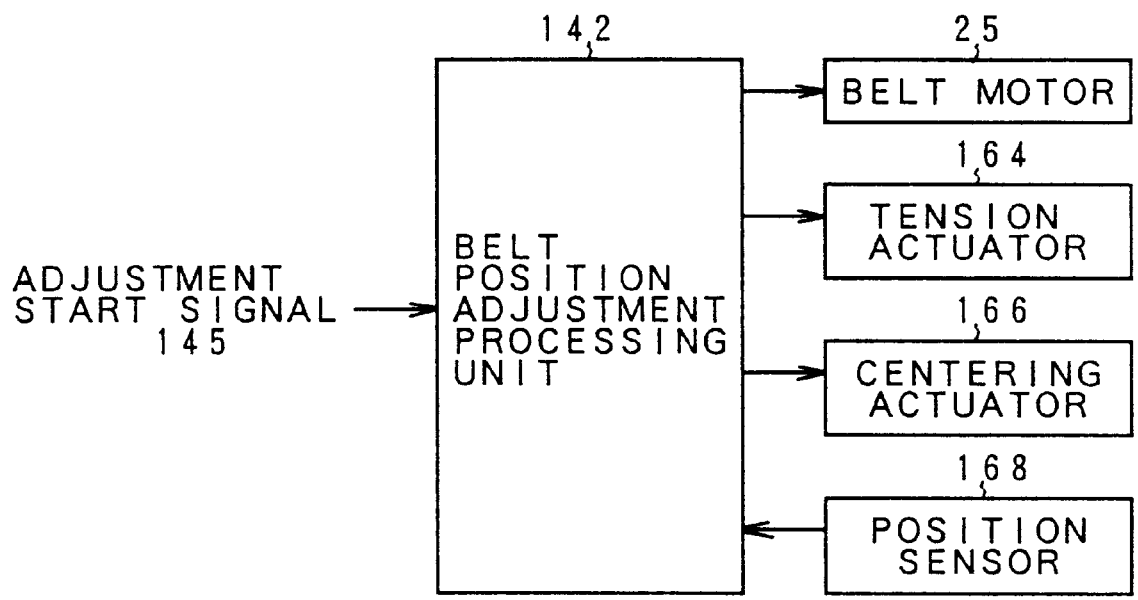

PRINTING APPARATUS

BACKGROUND OF THE INVENTION

1. Field of the Invention

The present invention relates generally to a printing apparatus for printing full color images through a superposing transfer of different color images effected by a plurality of electrostatic recording units each having an electrophotographic record printing function, and more particularly to a printing apparatus ensuring appropriate control of the quantities of development and consumption of color toners by the plurality of electrostatic recording units.

2. Description of the Related Art

Up until now, a color printing apparatus using electrophotographic recording comprises four electrostatic recording units corresponding to four colors, black (K), cyan (C), magenta (M) and yellow (Y) and arranged in tandem in the direction in which record papers are conveyed. The electrostatic recording units for four colors optically scan a photosensitive drum on the basis of image data to form latent images thereon, develop these latent images with color toners stored in respective developing vessels, and transfer them onto a record paper being conveyed at a certain speed in a superposed manner in the order of yellow (Y), magenta (M), cyan (C) and black (K), the resultant images being finally subjected to thermal fixing by a fixing device. In case of exhaustion of the color toners in the electrostatic recording units for yellow (Y), magenta (M), cyan (C) and black (K), there is a need for replacement of the entirety of the unit(s) or part of the unit(s). For this reason, the electrostatic recording units each have a structure allowing easy mounting and dismounting with the apparatus cover opened. Although in such a color printing apparatus comprising the Y, M, C and K electrostatic recording units arranged in tandem in the conveyance direction of the recording papers, toner units are loaded for operation which stores therein Y, M, C and K color toners by specified quantities, the quantities of toners consumed through the print operation may differ depending on colors. This is attributable to the fact that color toner components are consumed depending on the content of a color image printed. Furthermore, even though the consumption rates of the color toners used in the color image printing are the same, the toner developing quantities in the Y, M, C and K electrostatic recording units may be uneven, resulting in different toner consuming quantities from color to color. Consequently, when the residue of a most consumed color toner has reached a specified value or below, the other color toner cartridges containing sufficient residues required for development must also be replaced with new one, which results in a shorted toner life and hence in increased running costs.

Furthermore, in the case of the color printing apparatus comprising the Y, M, C and K electrostatic recording units arranged in tandem in the conveyance direction of the record papers, the transfer of the developing color toners is carried out by the Y, M, C and K electrostatic recording units while conveying the record papers adhered by suction onto the surface of the endless belt. Due to its large width exceeding the paper size, the conveyance belt may be gradually offset in the transverse direction orthogonal to the conveyance direction, during its travel around the rollers, owing to deflection of the belt or uneven tension. If this belt offset remains left as it is, the belt may diverge from the transfer positions on the photosensitive drum or may cause a breakage as a result of contact of the belt end faces with the apparatus interior. Thus, it is also conceivable to provide a structure for restricting the displacement of the belt by flanging the roller ends. However, once the belt starts to be offset, the offset could not be suppressed irrespective of the presence of the flanges due to the large width of the belt, resulting in a breakage of the belt.

SUMMARY OF THE INVENTION

According to the present invention, there is provided a printing apparatus ensuring as long a toner life as possible through the appropriate control of the consumption of a plurality of color toners and capable of simply adjusting the positional offsets of the belt in use.

The printing apparatus according to the present invention comprises a plurality of electrostatic recording units arranged in the direction in which record papers are conveyed by a belt, to optically scan a photosensitive drum rotated at a certain speed by a drum motor to form latent images thereon in conformity with image data, to develop them with toner components of different colors, for instance, with four color toners of Y, M, C and K and thereafter transfer them onto the record papers on the belt, and a conveyance belt mechanism for rotating the belt (endless belt) at a fixed speed through the drive of a pulley by the belt motor to thereby convey the record papers which have been adhered by suction onto the belt.

Color Toner Control

In the printing apparatus of the present invention, the toner developing quantity detection unit operates the plurality of electrostatic recording units, upon turning on the power, upon the start of the print job after the power on, and upon a receipt of a correction instruction through a command or a switching operation, to thereby allow a transfer of the toner marks of Y, M, C and K color components onto the belt.

The toner developing quantity correction unit detects toner developing quantities per unit area of the color toners on the basis of the detection signals of toner marks of the color components on the belt optically detected by the sensor. Then the toner developing quantity correction unit corrects the toner developing quantities so as to allow the toner consuming quantities of the plurality of electrostatic recording units to be substantially the same level on the basis of the detected toner developing quantities. According to such the color toner control of present invention, even though the consuming quantities of the different color toners of Y, M, C and K have been varied due to the coloring of the print images or to the unevenness in the toner developing quantities, the consuming quantities of the color toners are always controlled to be the same level throughout the operation of the apparatus, so that in cases where the residue of a specific color toner has been reduced to the specified value or below resulting in a need for toner replacement, the other color toners also remain at substantially the same level, with the result that there is little waste in spite of the replacement of all the color toner cartridges with new ones.

By virtue of the replacement of all the color toner cartridges effected in response to the request for replacement of a single color toner, there can be overcome a problem that the toner replacement work becomes complicated since another color toner replacement request may be issued after the elapse of a short period of time.

The toner developing quantity correction unit selects the minimum developing quantity from among toner developing quantities of the color components detected by the toner developing quantity detection unit and corrects the toner developing quantities of the other color components so as to coincide with the minimum developing quantity. It is thus possible for the consuming quantities of the other color toners to be controlled to coincide with the minimum toner consumption, thereby enabling the replacement life of the entire color toners to be elongated.

The correction of the toner developing quantities by means of the toner developing quantity correction unit may be carried out by the following one or combinations thereof.

I. The toner developing quantity is corrected by varying DC component voltage of the developing bias voltage being applied to the developing roller of the electrostatic recording unit.

II. The toner developing quantity is corrected by varying AC component voltage of the developing bias voltage being applied to the developing roller of the electrostatic recording unit.

III. The toner developing quantity is corrected by varying AC component frequency of the developing bias voltage being applied to the developing roller of the electrostatic recording unit.

IV. The toner developing quantity is corrected by varying a peripheral speed ratio between the photosensitive drum and the developing drum.

V. The toner developing quantity is corrected by varying the light emitting time of the LED array provided in the electrostatic recording unit.

VI. The toner developing quantity is corrected by varying the light emitting power of the LED array provided in the electrostatic recording unit.

The printing apparatus of the present invention further comprises a toner consuming quantity detection unit for detecting toner consuming quantities upon a print operation in the plurality of electrostatic recording units, and a toner residue control unit for obtaining current toner residues on the basis of the thus detected toner consuming quantities, to issue a request for toner supply when the current toner residues have lowered to a specified value or below. Although this toner replacement request is directed to a specific color toner, all the color toner cartridges are replaced in response to this toner replacement request since in the present invention the toner developing quantities are corrected so as to allow the consuming quantities of all the color toners to be substantially the same level. The toner consuming quantity detection unit calculates a toner consuming quantity Q on the basis of the rotation time T of the photosensitive drum provided in each of the plurality of electrostatic recording units and on the print number-of-pixels N per sheet. In other words, the toner consuming quantity detection unit obtains a reduction rate K of the toner consuming quantity relative to the drum rotation time T from a ratio (N/Nmax) of the print number-of-pixels N relative to full number-of-pixels Nmax which is determined by the paper size and resolution, and calculates the toner consuming quantity Q for each color component in conformity with the reduction rate K. A toner compulsory consumption unit may further be provided for compulsorily consuming the maximum toner residue of color components obtained by the toner residue control unit in associated the electrostatic recording unit, to thereby correct the maximum toner residue so as to be substantially the same level as that of toner residues of the other color components. In some types of print images, the consuming quantities of color toners may become uneven. It would be impossible in this case to keep the consuming quantities of all the color toners at the same level through the correction of the toner developing quantities. Thus, the least consumed toner, that is, the color toner having the maximum residue are compulsorily consumed so that it can keep the same residue as residues of the other color toners. The compulsory consumption of the toner may be carried out by developing toner images on the photosensitive drum but recovering them from the photosensitive drum as untransferred toners without being transferred to the record papers.

Belt Position Adjustment

The printing apparatus of the present invention further comprises a belt position adjustment processing unit for adjusting the belt rotated by the belt conveyance mechanism to its centering position. To this end, the belt transfer mechanism is provided with a tension control mechanism for varying the tension of the belt and with a position correction mechanism for displacing the belt to the direction orthogonal to the belt rotational direction. Correspondingly, the belt position adjustment processing unit during the dwell period of the plurality of electrostatic recording units controls the position correction mechanism to adjust the belt position to a specified centering position in the states where the belt tension has been reduced under the control of the tension control mechanism and where the belt conveyance speed has been lowered to a predetermined correction speed lower than the conveyance speed upon the print operation. The belt position adjustment processing unit after adjustment of the belt position to a specified centering position recovers linearly the belt tension and the belt speed to thereby eliminate the distortion in the belt which has been caused by the position adjustment. The belt position adjustment processing unit performs the belt position modification processing upon turning on the power, upon the start of the print job after the power on, and upon a receipt of a correction instruction through a command or a switching operation. The provision of such a belt position adjustment function enables the belt to be kept at its specified centering position simply and securely without need to provide an additional mechanism for mechanically preventing the positional offset of the belt, thereby effecting a secure prevention of the breakage or the like attributable to the belt positional offset.

The above and other objects, features and advantages of the present invention will become more apparent from the following detailed description with reference to the accompanying drawings.

BRIEF DESCRIPTION OF THE DRAWINGS

FIG. 4 (4A, 4B) is a block diagram of the hardware configuration in accordance with the present invention;

FIG. 23 is a functional block diagram of the belt position adjustment processing in accordance with the present invention;

DETAILED DESCRIPTION OF THE PREFERRED EMBODIMENTS

Apparatus Configuration

Figure 1:
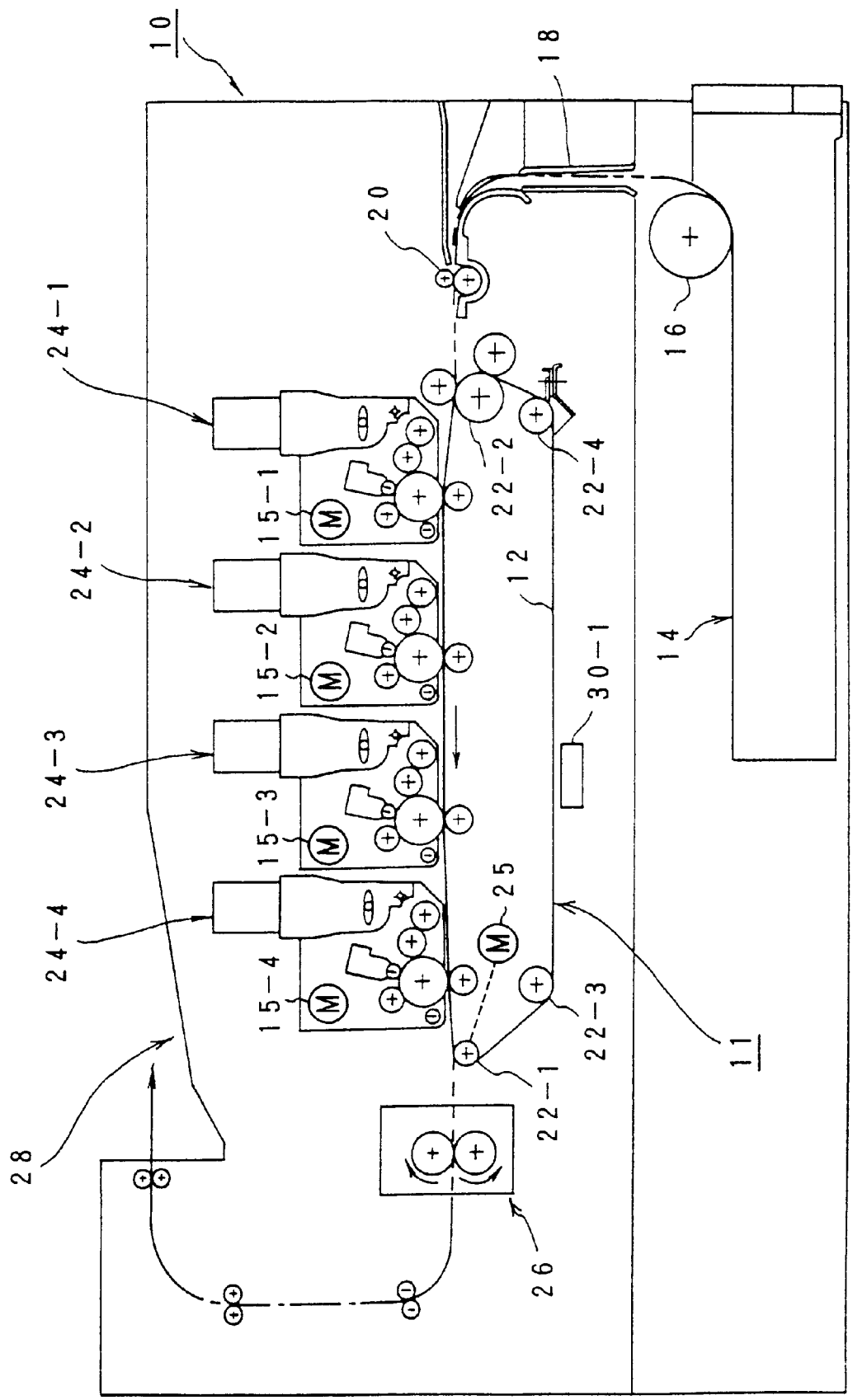
FIG. 1 is an explanatory diagram of the internal structure of an apparatus body in accordance with the present invention.

FIG. 1 shows an internal structure of a printing apparatus in accordance with the present invention. The printing apparatus comprises an apparatus body generally designated at 10 which includes a conveyance belt unit 11 for conveying record media, e.g., record papers. The conveyance belt unit 11 has an endless belt 12 rotatably provided thereon and formed of a transparent dielectric material, e.g., a suitable synthetic resin material. The endless belt 12 extends around four rollers 22-1, 22-2, 22-3 and 22-4. The conveyance belt unit 11 is detachably mounted on the apparatus body 10. The roller 22-1 serves as a driving roller which connects via a gear train (not shown) to a belt motor 25 to drive the endless belt 12 at a certain speed clockwise as indicated by an arrow.

The driving roller 22-1 serves also as an AC elimination roller for eliminating electric charges from the endless belt 12. The roller 22-2 serves as a driven roller and also as an electrifying roller for imparting electric charges to the endless belt 12. The rollers 22-3 and 22-4 serve as guide rollers and are arranged in proximity to the driving roller 22-1 and the driven roller 22-2, respectively. The upper traveling portion of the endless belt 12 between the driven roller 22-2 and the driving roller 22-1 forms a record paper moving path. The record papers are stacked in a hopper 14 and are taken out one by one from the topmost one by means of a pickup roller 16. The record papers pass through a record paper guide passage 18 and are introduced by a pair of record paper feed rollers 20 from the driven roller 22-2 side of the endless belt 12 onto the record paper moving path comprised of the belt upper traveling portion. After having passed through the record paper moving path, the record papers are discharged from the driving roller 22-1. The endless belt 12 is electrified by the driven roller 22-2 so that it can attract electrostatically the record papers when they are introduced from the driven roller 22-2 side onto the record paper moving path, thereby making it possible to prevent a positional offset of the record papers in motion. On the other hand, since the driving roller 22-1 on the discharge side acts as a destaticizing roller, electric charges are eliminated from a portion of the endless belt 12 in contact with the driving roller 22-1. For this reason the record papers are cleared of electric charges when passing through the driving roller 22-1, so that they can easily be separated for discharge from the endless belt 12 without being entangled in the belt lower portion. As will become apparent from later description, the conveyance belt unit 11 is further provided with a position correction mechanism for correcting positional offsets in the direction orthogonal to the conveyance direction of the endless belt 12. The apparatus body 10 includes therein four electrostatic recording units 24-1, 24-2, 24-3 and 24-4 for yellow (Y), magenta (M), cyan (C) and black (K), respectively, which are arranged in tandem in the order of Y, M, C and K from upstream toward downstream along the record paper moving path on the endless belt 12 upper side defined between the driven roller 22-2 and the driving roller 22-1. The electrostatic recording units 24-1, 24-2, 24-3 and 24-4 are provided respectively with drum motors 15-1 to 15-4 for driving photosensitive drums and are of the same structure except that toner components used as developers therein are respectively yellow (Y), magenta (M), cyan (C) and black (K). Thus, the electrostatic recording units 24-1 to 24-4 transfer and record a yellow toner image, a magenta toner image, a cyan toner image and a black toner image sequentially in a superposed manner onto the record papers moving along the record paper moving path on the endless belt 12 upper side, to thereby form a full color toner image thereon. Furthermore, in the case of the present invention, the color toner components in the electrostatic recording units 24-1 to 24-4 are controlled to be consumed to the same level.

Figure 2:
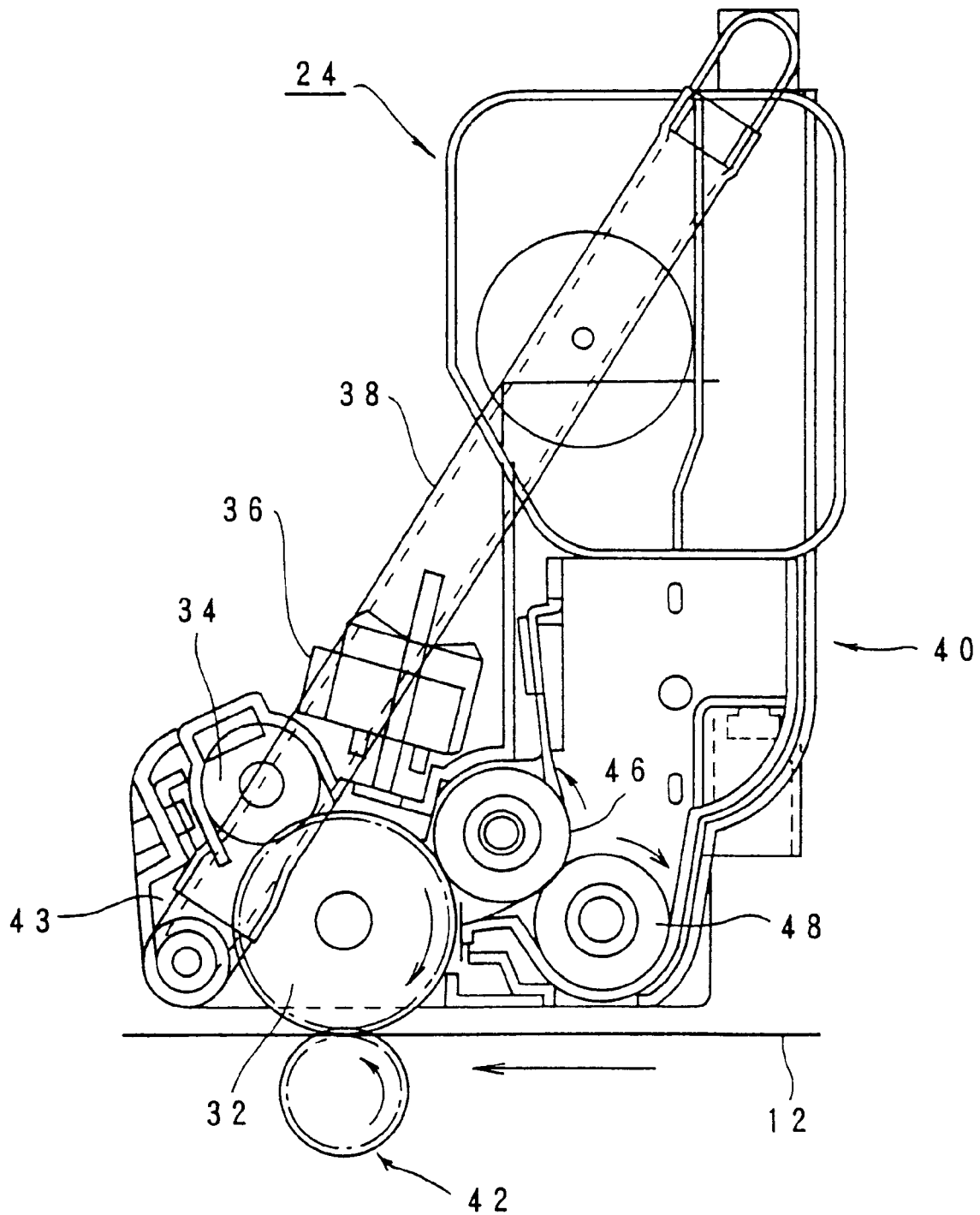
FIG. 2 is a sectional view of an electrostatic recording unit of FIG. 1.

FIG. 2 exclusively shows one of the electrostatic recording units 24-1 to 24-4 of FIG. 1. The electrostatic recording unit 24 is provided with a photosensitive drum 32 which is rotated clockwise at the time of a recording operation. Above the photosensitive drum 32 is disposed a pre-electrifier 34 in the form of, e.g., a corona electrifier or a scorotron electrifier, for uniformly imparting electric charges onto the rotating surface of the photosensitive drum 32. In the electrostatically charged region of the photosensitive drum 32 is disposed an LED array 36 acting as an optical writing unit which scans to cause light emissions allowing electrostatic latent images to be written thereon. More specifically, light emitting devices arranged in the horizontal scanning direction of the LED array 36 are driven on the basis of gradation values of pixel data (dot data) derived from image data provided as print information from a computer, a word processor, or the like, and therefore electrostatic latent images are written as dot images. The electrostatic latent images written onto the photosensitive drum 32 are electrostatically developed as electrified toner images of predetermined color toners by means of a developing vessel 40 located above the photosensitive drum 20. The electrified toner images on the photosensitive drum 20 are electrostatically transferred onto the record papers by means of an electrically conductive transfer roller 42 located below. More specifically, the electrically conductive transfer roller 42 is adjacent to the photosensitive drum 32 with a minute gap through which the endless belt 12 passes and serves to impart electric charges of a polarity opposite to that of the electrified toner images to the record papers being conveyed by the endless belt 12, thereby allowing the electrified toner images on the photosensitive drum 32 to be electrostatically transferred onto the record papers. Through the transfer process the photosensitive drum 32 has on its surface residual toners which have remained without being transferred onto the record papers. The residual toners are removed by a toner cleaner 43 located downstream of the record paper moving path with respect to the photosensitive drum 32. The removed residual toners are fed back to the developing vessel 40 by means of a screw conveyor 38. In the case of the toner control of the present invention, the toner having the maximum residue is subjected to a compulsory consumption processing so that the residues of Y, M, C and K toners can be kept at substantially the same level. For such a toner compulsory consumption, all of that color toner which has been electrostatically adhered for development to the photosensitive drum 32 is removed as residual toner by the toner cleaner 43 without being transferred onto the record papers by the electrically conductive transfer roller 42.

Referring again to FIG. 1, when passing through the record paper moving path of the endless belt 12 between the driven roller 22-2 and the driving roller 22-1, the recording papers are subjected to transfers of four color toner images of Y, M, C and K in a superposed manner by the electrostatic recording units 24-1 to 24-4, to carry full color images thereon. The recording papers are then delivered through the driving roller 22-1 to a heat roller type thermal fixing device 26 for subjecting the recording paper carrying full color images thereon to a thermal fixing. After the completion of the thermal fixing, the record papers pass through guide rollers into a stacker 28 provided on the upper part of the apparatus body, in which the record papers are stacked. A pair of sensors 30-1 and 30-2 are provided confronting the lower belt surface of the endless belt 12 in a direction orthogonal to the belt moving direction, only the sensor 30-1 closer to the viewer being visible in FIG. 1. These sensors 30-1 and 30-2 are used to optically read toner marks transferred on the endless belt 12 for reading toner developing quantities.

Figure 3:
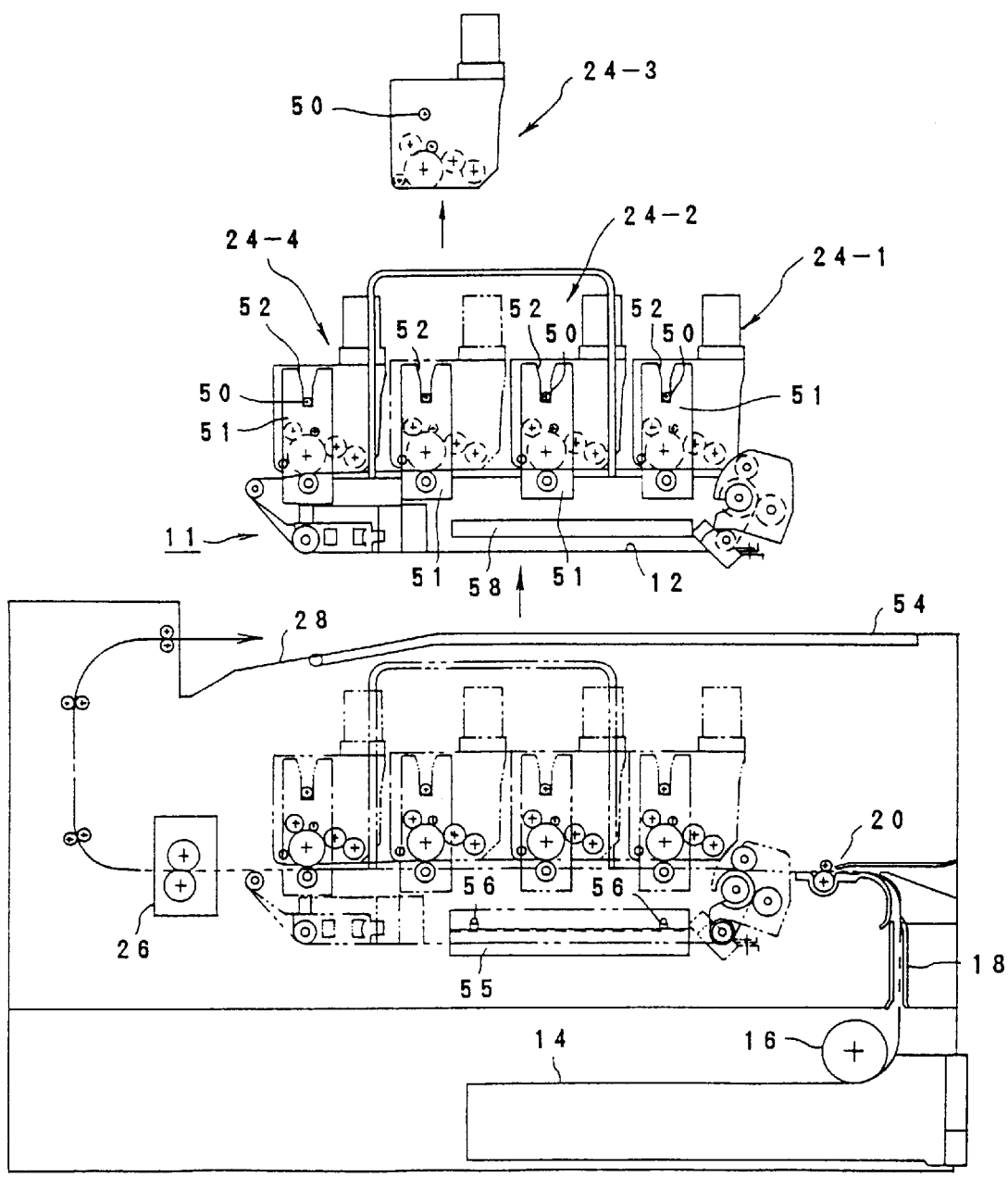
FIG. 3 is an explanatory diagram of a conveyance belt unit and the electrostatic recording unit of FIG. 1 being dismounted.

FIG. 3 shows the conveyance belt unit 11 dismounted from the apparatus body 10 of FIG. 1, with the electrostatic recording units 21-1 to 24-4 being detached therefrom. A cover 54 is attached to the top of the apparatus body 10 in such a manner as to be capable of being freely opened and closed around a pivotal point on the left. Within the apparatus body 10 is placed a frame 55 which has pins 56 arranged at two different positions on top of the frame. On the other hand, the side of the conveyance unit 11 shown dismounted upward is provided with a frame 58 which corresponds to the frame 55 of the apparatus body 10 and has pin holes at positions corresponding to the pins 56 of the frame 55. This makes it possible to extract the conveyance belt unit 11 upward from the pins 56 of the apparatus body 10 side by opening the cover 54 and pulling up the conveyance belt unit 11. The electrostatic recording units 24-1 to 24-4 are attached to the conveyance belt unit 11 by fitting pins 50 located at the sides of the electrostatic recording units 24-1 to 24-4 into attachment grooves 52 formed in the upper parts of attachment plates 51 arranged on both sides of the conveyance belt unit 11. Each attachment groove 52 includes an upper V-shaped groove and a lower straight groove having substantially the same width as that of the pins 50. The electrostatic recording units 24-1 to 24-4 can precisely be positioned in place on the conveyance belt unit 11 by aligning the pins 50 to the attachment grooves 52 and forcing the former down into the latter. In cases where it is desired that the electrostatic recording units 24-1 to 24-4 be supplied with toners or be maintained, they can easily be detached from the conveyance belt unit 11 by pulling them up in the same manner as for instance the electrostatic recording unit 24-3.

Hardware Configuration and Function

FIG. 4 is a block diagram of a hardware configuration of the printing apparatus in accordance with the present invention. The hardware of the present invention is constituted by an engine 60 and a controller 62. The engine 60 comprises a mechanical controller 64 for providing a control of the printing mechanisms such as the conveyance belt unit 11 and electrostatic recording units 24-1 to 24-4 of FIG. 1. The mechanical controller 64 is associated with an MPU for sensor processing 66 which executes toner control processing and belt position adjustment processing in accordance with the present invention. The MPU for sensor processing 66 receives via AD converters 68-1 and 68-2 detection signals from a pair of sensors 30-1 and 30-2, respectively, disposed below the endless belt 12. The mechanical controller 64 is connected via an engine connector 70 to the controller 62 side. In this case the printing mechanism provided in the engine 60 is shown including exclusively the endless belt 12 and LED arrays 36-1, 36-2, 36-3 and 36-4 provided for the electrostatic recording units for Y, M, C and K.

The controller 62 comprises an MPU for controller 72 to which a personal computer 92 for instance acting as a host apparatus is connected via an interface processing unit 74 and a controller connector 76. The personal computer 92 includes a driver 96 used for printing color image data provided from any application program 94, the driver 96 being connected via a personal computer connector 98 to the controller connector 76 of the controller 62. The MPU for controller 72 of the controller 62 includes image memories 82-1, 82-2, 82-3 and 82-4 for storing Y, M, C and K image data transmitted from the personal computer 92 into pixel data (dot data) for storage. On the other hand, the MPU for controller 72 is connected via an interface processing unit 78 and a controller connector 80 to the engine 60. The MPU for controller 72 includes an addressing unit 84 for addressing when storing color pixel data into the image memories 82-1 to 82-4. A resolution conversion unit 88 follows the image memories 82-1 to 82-4. The resolution conversion unit 88 is provided with buffer memories 90-1, 90-2, 90-3 and 90-4 corresponding respectively to Y, M, C and K. The resolution conversion unit 88 decomposes, in a vertical scanning direction (paper conveyance direction) of the LED array 36-1 to 36-4, pixel data read from the image memories 82-1 to 82-4 to convert them into two high resolution pixel data. If, for instance, the resolutions when stored in the image memories 82-1 to 8-4 are 600 dpi in the horizontal scanning direction and 600 dpi in the vertical scanning direction, then the resolution conversion unit 88 converts the input data into high resolution pixel data with 1200 dpi in the vertical scanning direction but with 600 dpi in the horizontal scanning direction.

Figure 5A:
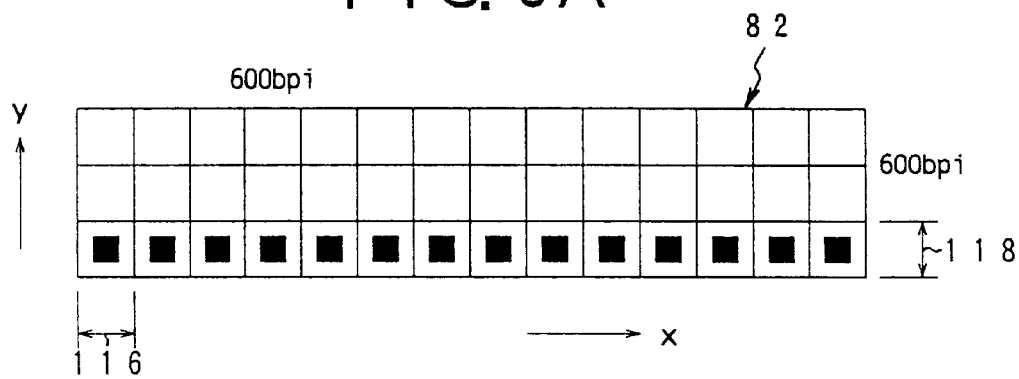
FIGS. 5A and 5B are explanatory diagrams of the conversion contents of a resolution conversion unit of FIG. 4.
Figure 5B:
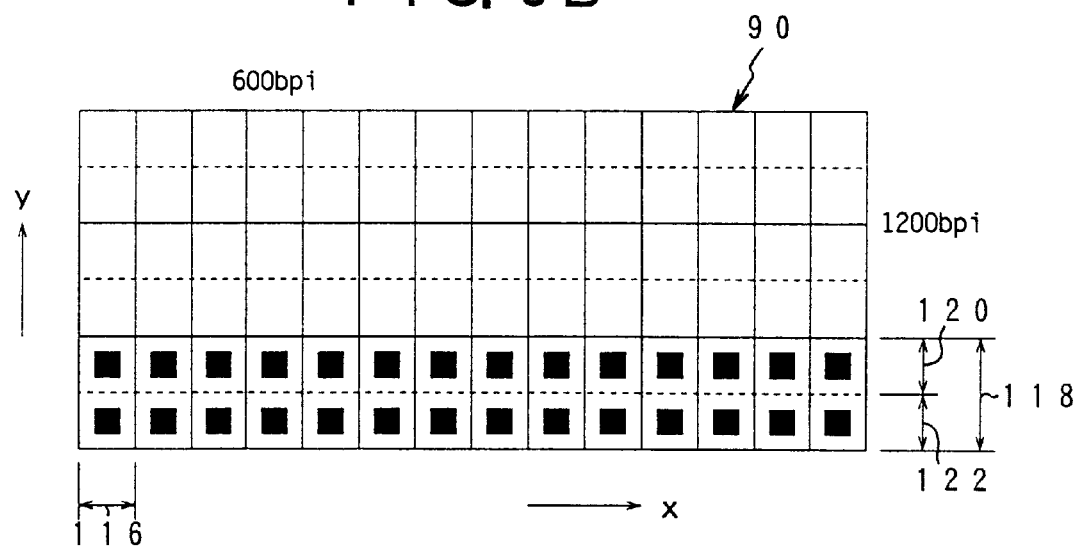

FIGS. 5A and 5B illustrate conversion processing of the high resolution pixel data for the buffer memory 90 provided in the resolution conversion unit 88 of FIG. 4. FIG. 5A shows part of a memory area of the image memory 82, in which pixel data are stored for each pixel area 116 in the horizontal scanning direction x, with one pixel area 118 in the vertical scanning direction y. For instance, the resolution in the horizontal scanning direction x is 600 dpi and the resolution in the vertical scanning direction y is also 600 dpi. The buffer memory 90 provided in the resolution conversion unit 88 serves to convert the pixel data stored in such an image memory 82 into high resolution pixel data as shown in FIG. 5B. The memory space of the buffer memory 90 is 600 dpi in the horizontal scanning direction x, of which one pixel area 116 stores one pixel data in the same manner as in the image memory 82 of FIG. 5A. On the contrary, in the vertical scanning direction y, one pixel area 118 is divided into two data areas, that is, a first scan data area 120 and a second scan data area 122, thereby allowing one pixel data read from the image memory 82 of FIG. 5A to be decomposed into two pixel data to obtain high resolution pixel data for storage. For this reason, the resolution in the vertical scanning direction of the buffer memory 90 is converted into a resolution equal to integer times the resolution 600 dpi of the image memory 82, for instance, into 1200 dpi which is twice as much. It is to be appreciated that the resolution in the vertical scanning direction could be varied if necessary to any arbitrary integer times, for instance, to three times, four times and so forth.

Color Toner Control

Figure 6A:
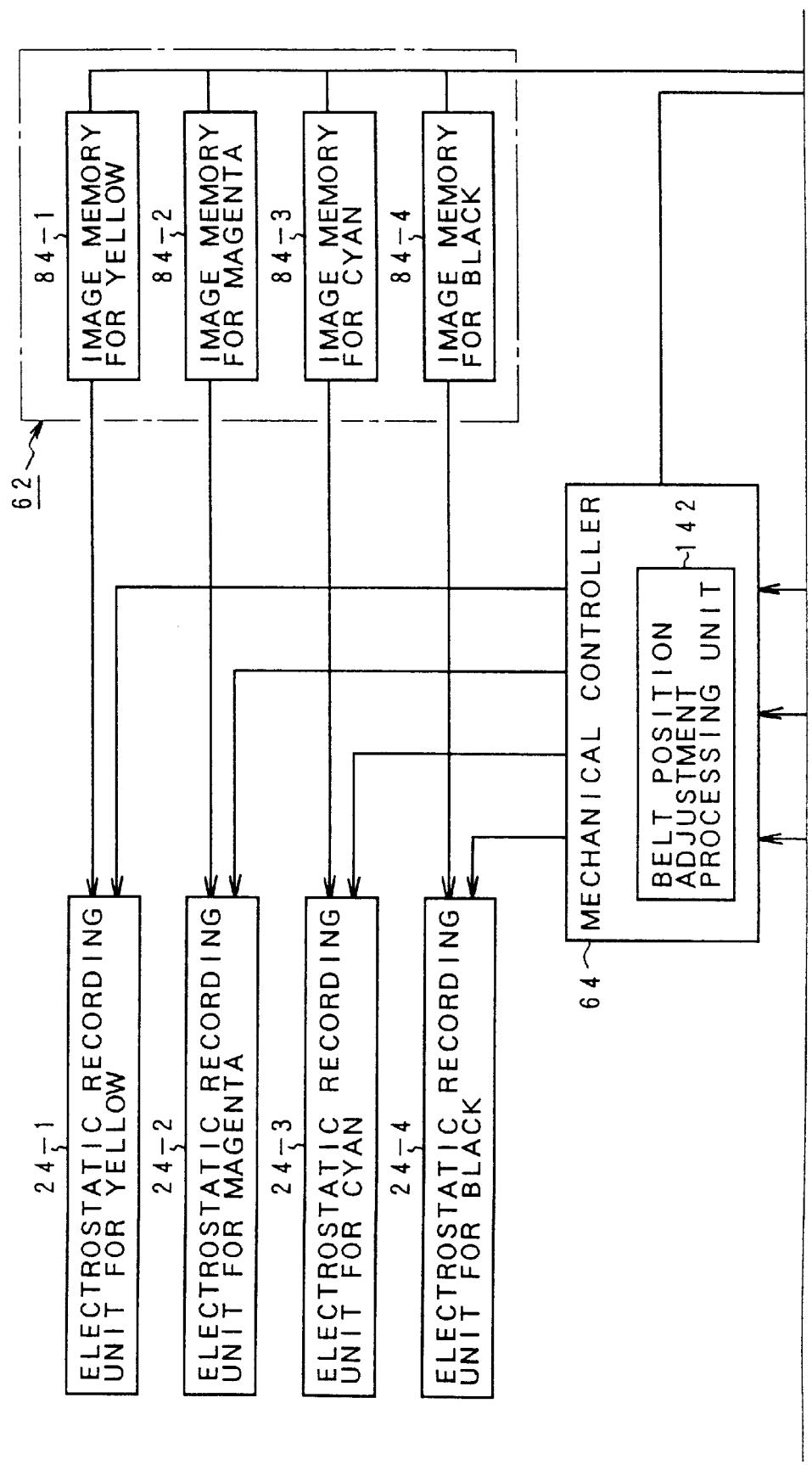
FIGS. 6A and 6B are functional block diagrams of toner control processing in accordance with the present invention.
Figure 6B:
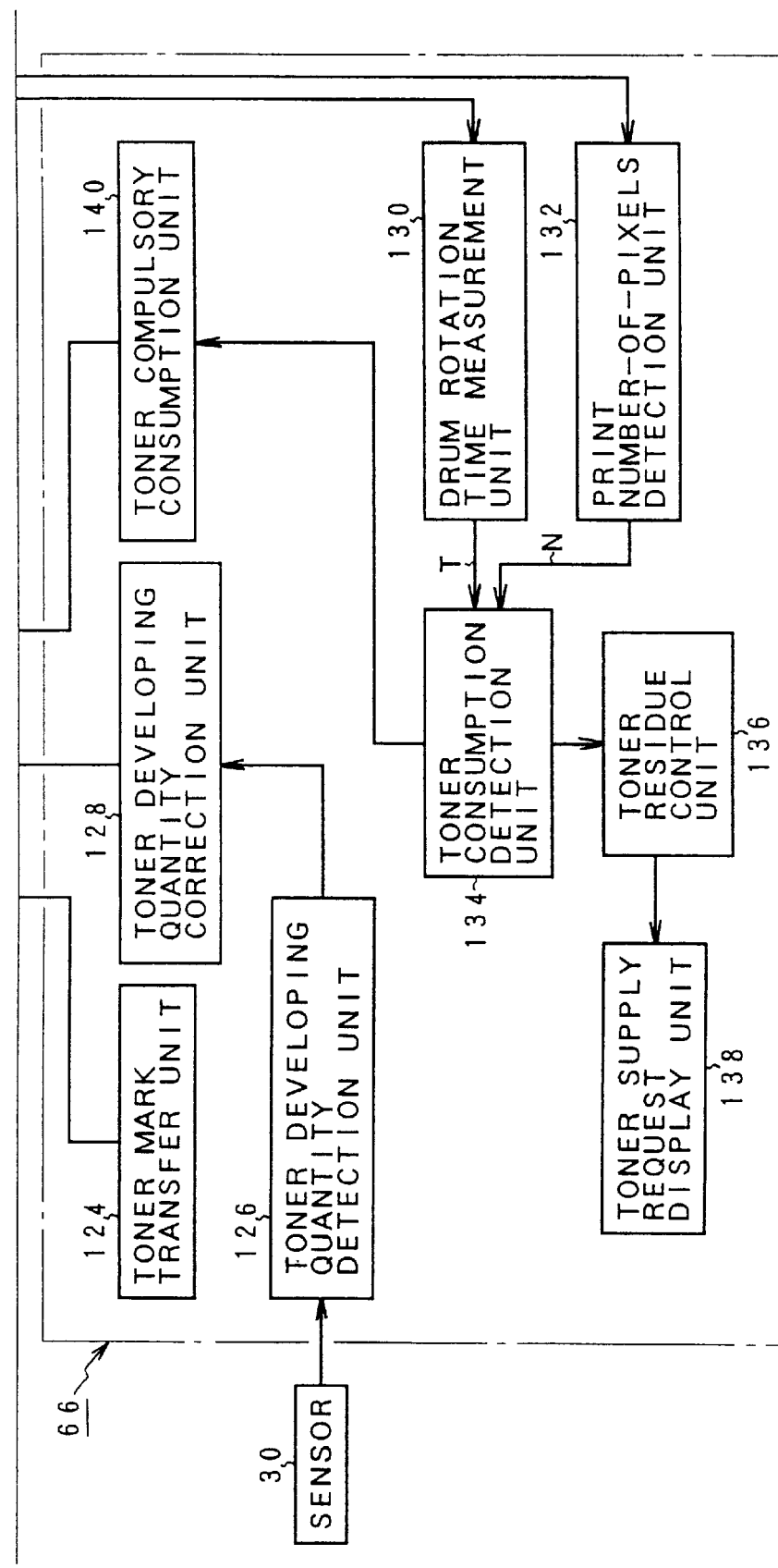

FIGS. 6A and 6B are block diagrams of a processing function for controlling four color toners of Y, M, C and K used in the printing apparatus of the present invention, the function being implemented by the MPU for sensor processing 66 of the engine 60 of FIG. 4. The MPU for sensor processing 66 with the color toner control function detects Y, M, C and K toner consumption, obtains toner residue at that point of time from the respective toner consumption and, when the toner residue reaches a predetermined quantity or below at which the development is impossible to perform, requests a replacement for the supply of that toner. In order to suppress the consumption of the Y, M, C and K color toners to the same level, toner marks of each color are transferred by the Y, M, C and K electrostatic recording units 24-1 to 24-4 onto the endless belt 12 during the dwell period of the printing operation, and the toner marks on the belt are optically detected by sensors to obtain toner developing quantities to correct the other toner developing quantities so as to ensure the toner quantities corresponding to the least toner developing quantity among the toner developing quantities of the plurality of colors. The detection of the toner consumption and control of the toner residue by the MPU for sensor processing 66 is performed by use of a drum rotation time measurement unit 130, a print number-of-pixels detection unit 132, a toner consumption detection unit 134, a toner residue control unit 136, a toner supply request display unit 138 and a toner compulsory consumption unit 140. The detection and correction of the developing quantities of the Y, M, C and K color toners is performed by use of a toner mark transfer unit 124, a sensor 30, a toner developing quantity detection unit 126 and a toner developing quantity correction unit 128. Furthermore, in the case of the printing apparatus of the present invention, the mechanical controller 64 has a function as a belt position adjustment unit 142 for adjusting the position of the endless belt 12 provided in the conveyance belt unit 11 during the dwell period of the printing operation.

Figure 7:
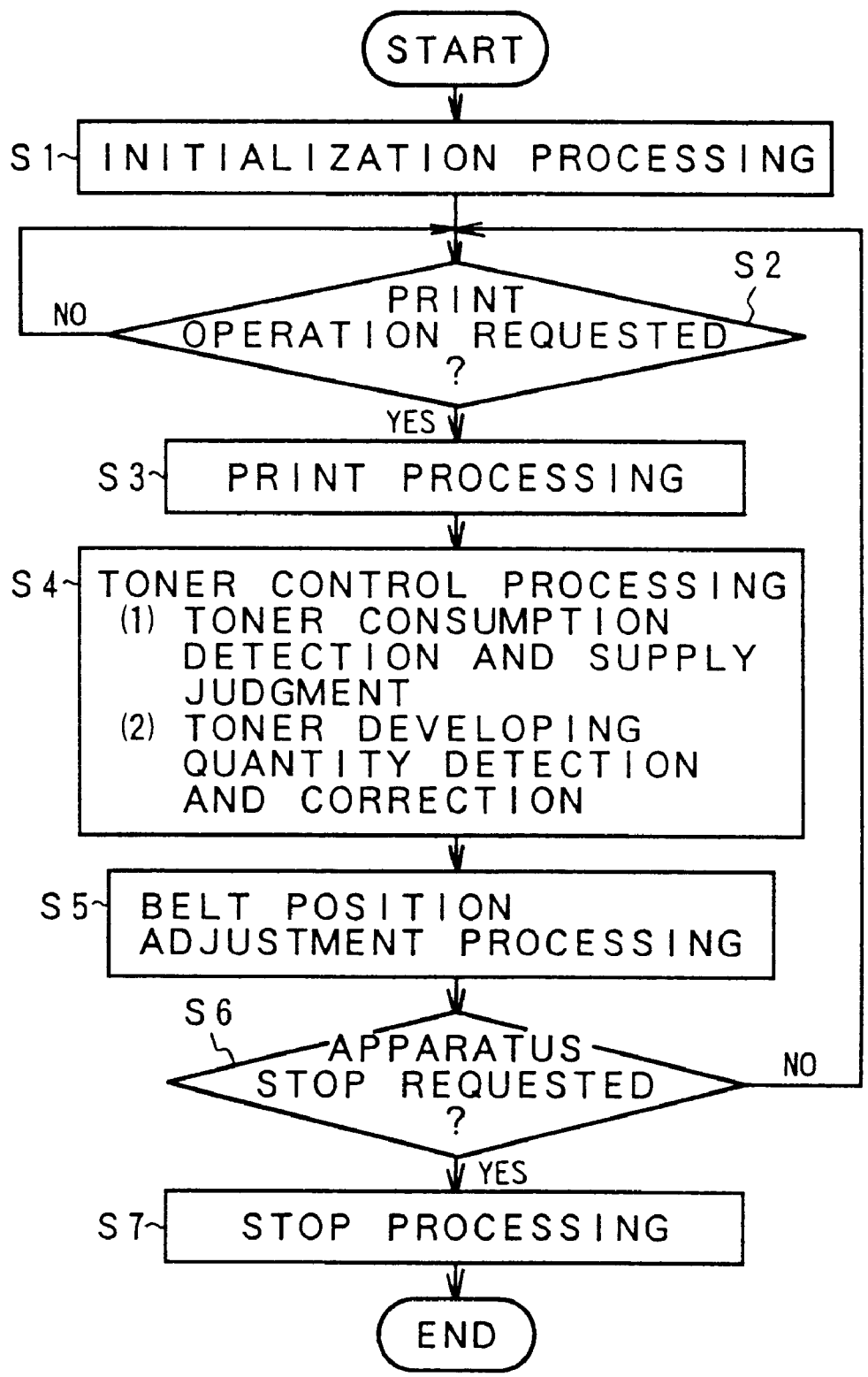
FIG. 7 is a flowchart of the overall print processing in accordance with the present invention.

FIG. 7 is a flowchart of an overall processing action including the toner control and the belt position adjustment processing executed in the printing apparatus of the present invention. First, in step S1, the power switch for the apparatus is turned on to perform predetermined initialization processing. Then in step S2, a check is made to see if a print request has been issued from the host apparatus such as the personal computer 92 shown in FIG. 4, and if the print request has been received, the procedure goes to step S3 in which a print operation is carried out on the basis of image data transmitted from the host apparatus. After the completion of the print operation in step S3, the procedure advances to step S4 to perform the toner control processing. This toner control processing includes:

I. toner consumption detection and supply judgment; and

II. toner developing quantity detection and correction.

Subsequently, the procedure goes to step S5 to perform belt position adjustment processing. If in step S6 no apparatus stop request has been issued, the procedure returns to step S2 to wait for a next print request. If an apparatus stop request has been issued, predetermined stop processing is performed in step S7, after which the apparatus power is shut off through the power off operation.

Description will be made of the toner consumption detection and toner supply judgment constituting the toner control processing of step S4 of FIG. 7. The toner consumption detection and the toner supply judgment is performed by use of the drum rotation time measurement unit 130, the print number-of-pixels detection unit 132, the toner consumption detection unit 134, the toner residue control unit 136, the toner supply request display unit 138 provided in the MPU for sensor processing 66 of FIGS. 6A and 6B, in addition to the function of the toner compulsory consumption unit 140.

Figure 8:
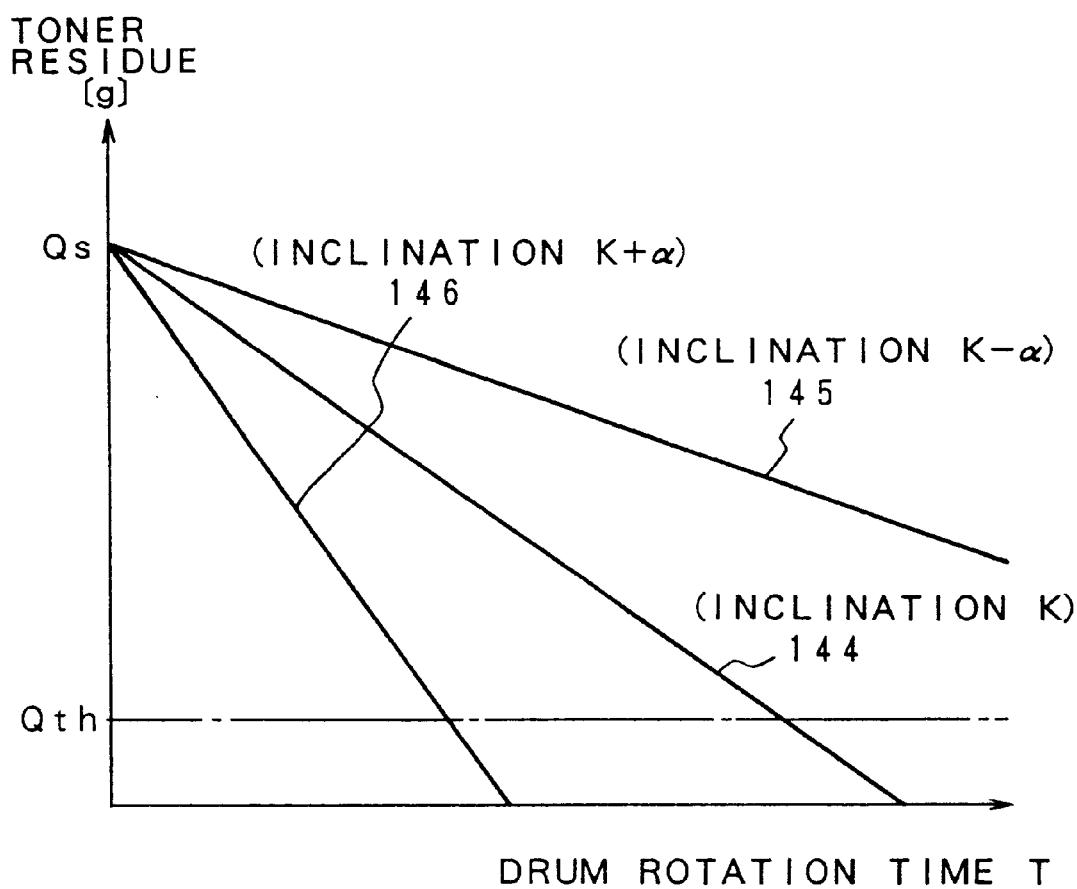
FIG. 8 is a characteristic diagram of the toner residues relative to the drum rotation time when the pixel density is employed as a parameter.

FIG. 8 illustrates a principle for detecting the toner consumption by the toner consumption detection unit 134 of FIG. 6B. In the case of the toner consumption detection of the present invention, the drum rotation time measurement unit 130 first measures the drum rotation time T during the print operation due to a relationship in which the use of the color toners in the Y, M, C and K electrostatic recording units 24-1 to 24-4 increases in response to the drum rotation time T of the photosensitive drum for performing the development by use of the color toners. Furthermore, since the toner consumption varies depending on the ratio (N/Nmax) of an actually printed print number-of-pixels N relative to a maximum print number-of-pixels Nmax of a record paper, the print number-of-pixels detection unit 132 detects the print number-of-pixels N during the print operation to employ it as a parameter for the calculation of the toner consumption. FIG. 8 illustrates variations of the toner residue Q relative to the drum rotation time T. In this example, set as an inclination K defining a line 144 of the toner residue Q relative to the drum rotation time T is a ratio (N/Nmax) of a statistically obtained print number-of-pixels N relative to the full print number-of-pixels Nmax. In addition to the standard characteristic represented by the line 144, two inclinations (K−α) and (K+α) are defined for lines 145 and 146, respectively, with respect to the case where the print number-of-pixels has increased or decreased in a predefined range. In the case of the printing apparatus of the present invention, the resolution is for instance 600 dpi in the horizontal scanning direction when it is the scanning direction of the LED array provided in the electrostatic recording units 24-1 to 24-4, and also for instance 600 dpi in the vertical scanning direction which is the belt conveyance direction, so that depending on the paper size to be printed, the maximum print number-of-pixels Nmax can definitely be obtained by multiplying the area of the effective print region on that paper by the number-of-pixels per unit area. Then the print number-of-pixels detection unit 132 detects the print number-of-pixels N, that is, the number of pixels in which are stored effective pixel data for driving the LED light emission of the pixel data introduced into the Y, M, C and K image memories 84-1 to 84-4 upon the print operation, and the toner consumption detection unit 130 obtains the ratio (N/Nmax) of the both, allowing a selection of corresponding one from among the lines 144, 145 and 146 of FIG. 8 to calculate the toner consumption from the drum rotation time T at that time. After the detection by the toner consumption detection unit 134 of toner consumption Qyu, Qmu, Qcu and Qku of the Y, M, C and K color toners from the drum rotation time T and the print number-of-pixels N at that time, the toner residue control unit 136 obtains current toner residues Qy, Qm, Qc and Qk of the Y, M, C and K color toners. That is, the current toner residue can be obtained by subtracting this time detected toner consumption from the last time toner residue. Each time the toner residue is calculated, the toner residue control unit 136 compares it with a threshold value Qth indicative of the minimum toner residue which does not ensure the predefined development, and if any toner residue has reached the threshold value Qth or below, the toner supply request display unit 138 indicates a request for supply of all the color toners to the operator. The toner is usually contained in a toner cartridge having a predetermined quantity, e.g., 600 g of capacity. Accordingly, in response to the toner supply request display, the Y, M, C and K electrostatic recording units 24-1 to 24-4 are taken out as shown in FIG. 3 to replace the associated toner cartridges with new ones. In this manner, when a specific color toner residue has reached the threshold value Qth or below, there remains left the other color toners of quantities capable of development. In this case, all the color toner residues are corrected in the present invention so as to result in substantially the same level on the basis of the detection results of the toner developing quantities during the use of the apparatus, so that when a specific color toner residue has reached the threshold value Qth or below the other color residues also approach the threshold value Qth. Thus, even though all the color toner cartridges have been replaced with new ones in response to the display of the toner supply request, such a situation could be fully avoided that there may occur a waste of toner due to too much toner residue to be disposed of. In order to control the use of all the color toners to substantially the same level during the running of the printing apparatus in this manner, Y, M, C and K toner marks are transferred by the toner mark transfer unit 124 onto the endless belt during the dwell period of the print operation and are optically detected by the sensor 30 to allow the toner developing quantity detection unit 126 to detect the developing quantities of the toner components, after which the toner developing quantity correction unit 128 corrects the other color toner developing quantities so as to coincide with the minimum toner developing quantity among the detected toner developing quantities.

Figure 9:
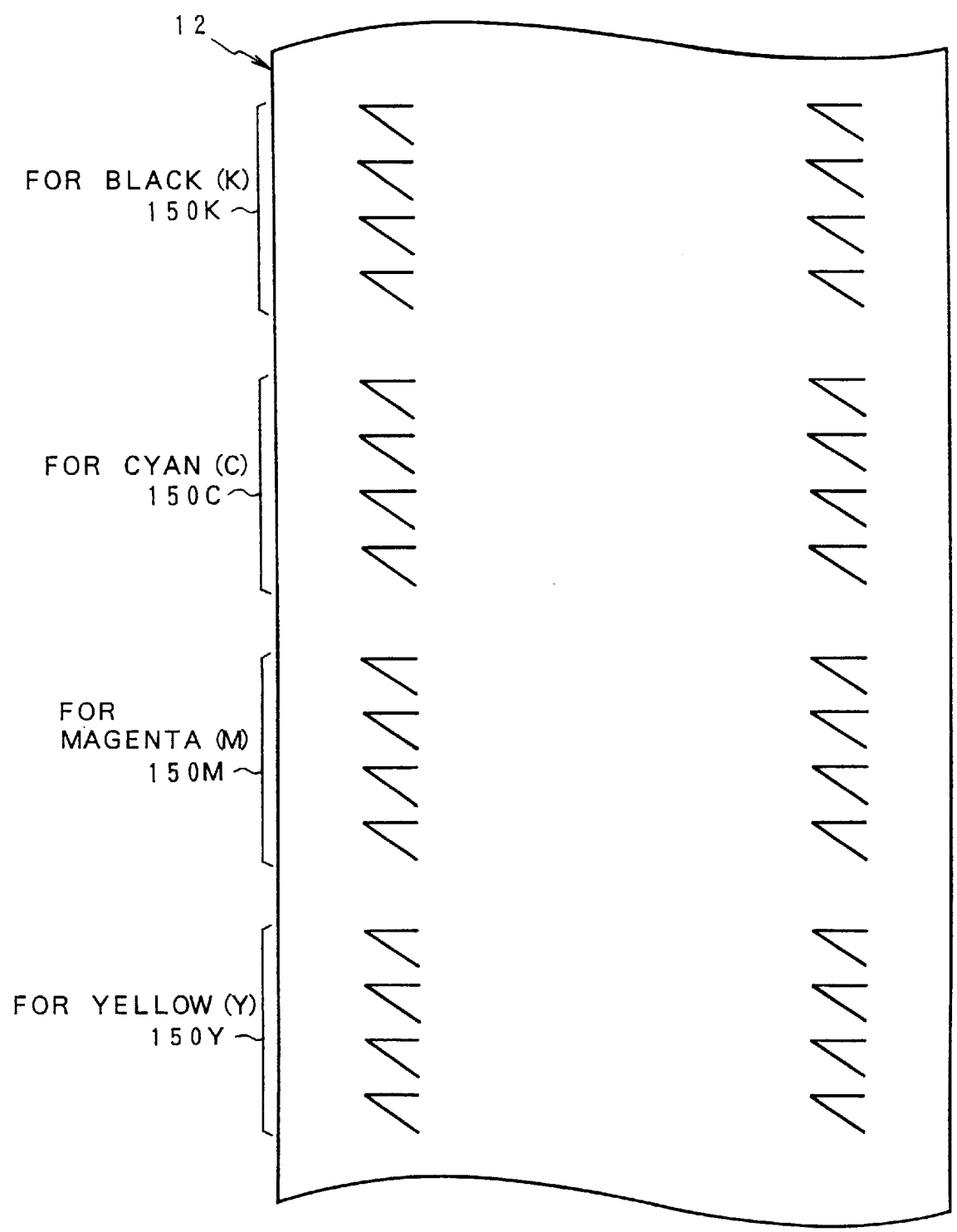
FIG. 9 is an explanatory diagram in which Y, M, C and K toner marks are transferred onto the belt.

FIG. 9 illustrates toner marks transferred onto the endless belt 12 by means of the toner mark transfer unit 124 of FIG. 6B. At the dwell timing where the print processing in step S3 of FIG. 7 has been completed, the toner mark transfer unit 124 of the MPU for sensor processing 66 causes a drive of the Y, M, C and K electrostatic recording units 24-1 to 24-4 to transfer onto both sides of the endless belt 12 a plurality of black toner marks 150K, cyan toner marks 150C, magenta toner marks 150M and yellow toner marks 150Y in a sequential manner as shown in FIG. 9. The toner marks transferred onto the endless belt 12 in this manner are optically detected by the sensor 30.

Figure 10:
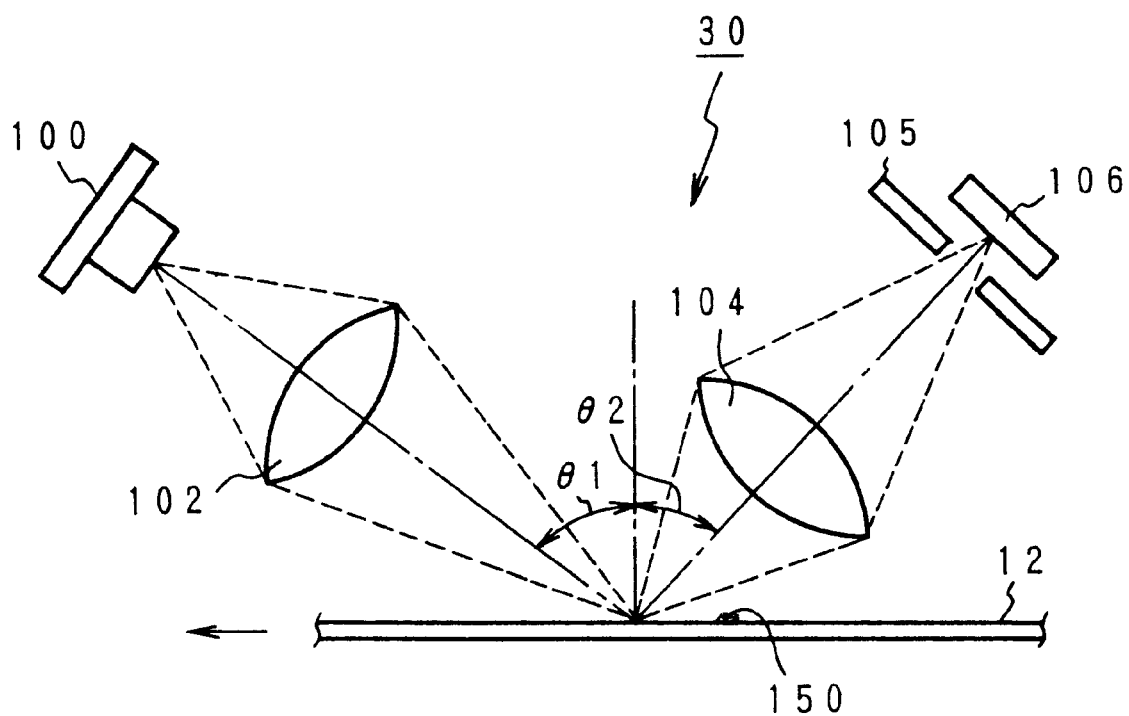
FIG. 10 is an explanatory diagram of a sensor structure for reading the toner marks of FIG. 9.

FIG. 10 illustrates an embodiment of the sensor 30 of FIG. 6B. The sensor 30 comprises a light emitting device 100 disposed at an angle of incidence $\theta 1$ relative to the endless belt 12 and an image forming lens 102 for condensing light beams from the light emitting device 100 to form a beam spot on the endless belt 12. At an angle of exit $\theta 2$ relative to this beam spot is arranged a light receiving device 106 by way of a condenser lens 104 and a slit 105. In this case, the angle of incidence $\theta 2$ of the light emitting device 100 is determined so as to ensure an optimum reflected light quantity in the range e.g., from 45° to 75°. This sensor 30 optically detects the toner marks 150 transferred onto the endless belt 12 by means of the electrostatic recording units. More specifically, at the positions of the belt surfaces without the toner marks 150 the incident light from the light emitting device 100 is fully reflected to enter the light receiving device 106, so that light receiving signals from the light receiving device 106 have levels exceeding a specified value. When the toner marks 150 reach the detection position as a result of the movement of the endless belt 12, the incident light is diffusely reflected since the toner marks 150 are made of minute toner components, resulting in a reduction in reflected light quantity transmitted to the light receiving device 106. The developing quantities of the toner marks 150 can be detected on the bases of the reduction in level of the light receiving signals from the light receiving device 106.

Figure 11:
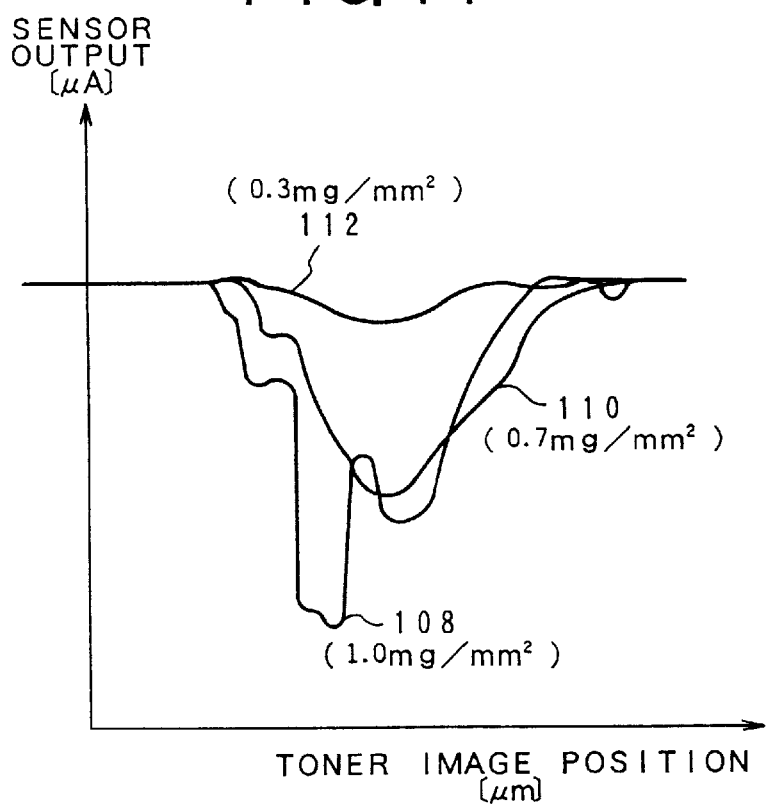
FIG. 11 is an explanatory diagram of the sensor output of the sensor of FIG. 10 relative to the positions of the toner image.

FIG. 11 shows results of measurement of the sensor outputs of the toner sensor 30 relative to the displacement in position of the toner images caused by the movement of the belt. In this diagram, a measurement curve 108 is obtained when the toner quantity is 1.0 mg/mm$^2$, a measurement curve 110 with 0.7 mg/mm$^2$, and a measurement curve 112 with 0.3 mg/mm$^2$. As is apparent from the toner sensor output values, there are obtained sensor output values corresponding to toner developing quantities relative to the belt surfaces.

Figure 12:
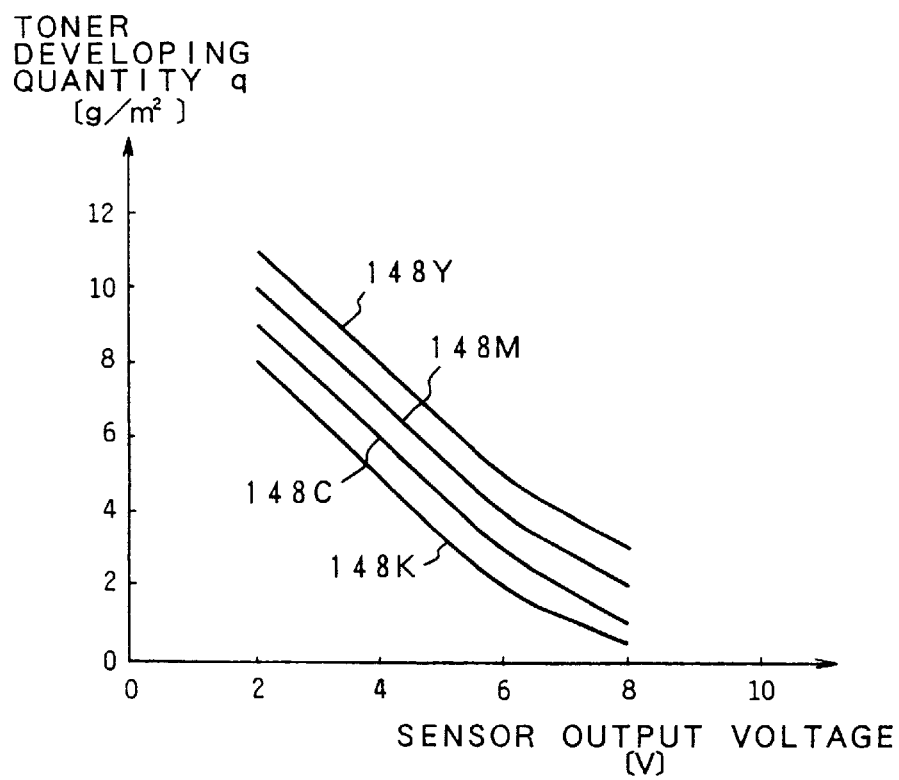
FIG. 12 is a characteristic diagram of the sensor output and the toner developing quantities.

FIG. 12 shows a relationship between sensor output voltages [V] and toner developing quantities q [g/m$^2$] obtained when the toner sensor 30 of FIG. 11 has detected the toner marks 150Y, 150M, 150C and 150K of Y, M, C and K, respectively, of FIG. 9. That is, measurement curves 148Y, 148M, 148C and 148K represent yellow toners, magenta toners, cyan toners and black toners, respectively. Although relationships of the toner developing quantities relative to the sensor output voltages are similar among the measurement lines 148Y to 148K, the same toner developing quantities result in different sensor output voltages in response to the lightness of Y, M, C and K due to the detection of scattered lights in response to the toner developing quantities. That is, in the order of Y, M, C and K, the same toner developing quantity results in higher sensor output voltages.

Figure 13:
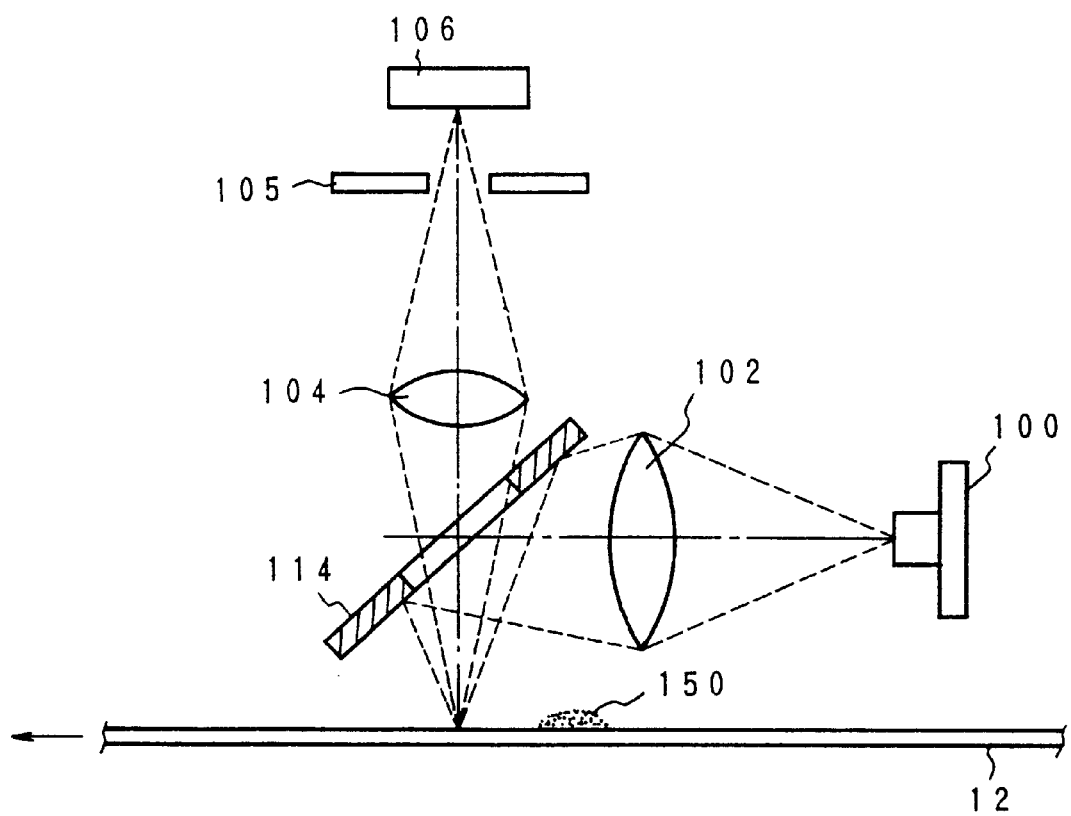
FIG. 13 is an explanatory diagram of another sensor structure for reading the toner marks of FIG. 9.

FIG. 13 shows another embodiment of the sensor 30. In the case of this sensor 30, the light emitting device 100 and the image forming lens 102 are arranged substantially parallel to the endless belt 12, with a donut mirror 114 being diagonally arranged at the detection position. Light beams from the light emitting device 100 are condensed by the image forming lens 102 and then reflected on a peripheral mirror surface of the donut mirror 114 to form a beam spot on the endless belt 12. The reflected light beams from the belt surface 12 pass through the central hole of the donut mirror 114 and are condensed by the condenser lens 104 to form an image on the light receiving device 106 by way of the slit 105. In this embodiment also, when the belt surface of the endless belt 12 lies at positions other than the toner mark 150 transfer positions, the reflected light quantities present the maximum, allowing the light receiving signals of the light receiving device 106 to have a level exceeding a predetermined value. Once the toner marks 150 transferred on the endless belt 12 reach the detection positions, the reflected light delivered to the light receiving device 106 is decreased due to the scattering of light caused by the toner particles. This reflected light quantity corresponds to the toner quantity of the toner mark 150, that is, toner developing quantity, so that there is obtained a relationship between the sensor output voltages and the toner developing quantities q similar to FIG. 12.

In the toner developing quantity detection unit 126 provided in the MPU for sensor processing 66 of FIG. 6B, there is previously stored in the form of table information the correlation between the output voltages from the sensor 30 and the toner developing quantities q as shown in FIG. 12, so that the table can be referred to on the basis of the sensor output voltage from the toner sensor 30, to thereby detect the toner developing quantities qy, qm, qc and qk for the Y, M, C and K corresponding thereto. The Y, M, C and K toner developing quantities detected by the toner developing quantity detection unit 126 are imparted to the toner developing quantity correction unit 128 in which the other toner developing quantities are corrected so as to coincide with the minimum developing quantity among the detected toner developing quantities. The Y, M, C and K toner developing quantities are controlled to coincide with the least developing quantity in this manner so that the toner consumption is minimized, resulting in an elongated toner replacement life up to the issue of a toner supply request when the toner residue has reached the threshold value qth.

In order to correct toner developing quantities by means of the toner developing quantity correction unit 128, there are provided the following six different methods which include:

I. varying DC component voltage of the developing bias voltage being applied to the developing roller of the electrostatic recording unit;

II. varying AC component voltage of the developing bias voltage being applied to the developing roller of the electrostatic recording unit;

III. varying AC component frequency of the developing bias voltage being applied to the developing roller of the electrostatic recording unit;

IV. varying a peripheral speed ratio between the photosensitive drum and the developing drum;

V. varying the light emitting time of the LED array provided in the electrostatic recording unit; and VI. varying the light emitting power of the LED array provided in the electrostatic recording unit.

It is to be appreciated that these six different adjustments for correcting toner developing may be employed solely or combined with one another or several ones.

Figure 14:
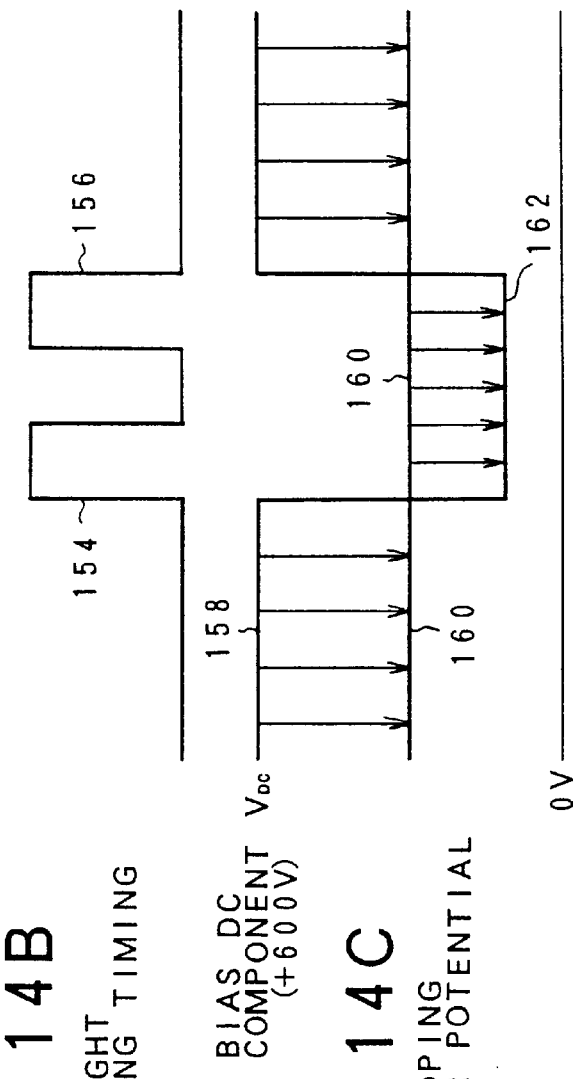
FIGS. 14A to 14C are explanatory diagrams of LED light emission and developing bias voltage which determine the toner developing quantities.

FIGS. 14A to 14C illustrate a principle for correcting the toner developing quantity in the electrostatic recording unit.

FIG. 14A shows a light emitting power of the LED provided in the electrostatic recording unit. As shown in FIG. 14B, the printing apparatus of the present invention decomposes one pixel into two pixels in the vertical scanning direction which is the belt conveyance direction to thereby enhance the resolution, so that there occur two light emitting timings 154 and 156. The light emission at these two light emitting timings results in a distribution profile of the LED light emitting power as shown in FIG. 14A. FIG. 14C shows the developing bias voltage between the developing roller 46 and the photosensitive drum 32 in the electrostatic recording unit of FIG. 2. First the photosensitive drum 32 is at the potential of e.g., 600V due to the bias DC component $V_{DC}$ whereas the developing roller 46 is at the potential 160 of e.g., +300V lower than the above voltage. In this state, when the light by the LED light emitting power 152 of FIG. 14A is irradiated onto the photosensitive drum 32, there is formed a latent image having a potential 162 lower than the developing roller potential 160. In this case, electric lines of force from the bias DC component 158 toward the developing roller potential 160 act as a force moving toner components from the photosensitive drum 32 to the developing roller 46, in other words, a force preventing the toner from being supplied from the developing drum 46 to the photosensitive drum 32. On the contrary, electric lines of force from the developing roller potential toward the electrostatic latent image level 162 formed by the LED light emitting power 152 act as a moving force from the developing roller 46 to the photosensitive drum 32, in other words, a moving force for supplying the toner components from the developing roller 46 to the photosensitive drum 32. Then, the electrostatic latent image level 162 formed through the irradiation of light to the developing roller potential 160 becomes deeper accordingly as the light emitting power of the LED increases, resulting in a larger moving force to the photosensitive drum. As a result of this, the toner developing quantity, that is, the quantity of the toner supplied from the developing roller 46 to the photosensitive drum 32 can be controlled through the control of the bias voltage, the control of the LED light emitting power, and the control of the LED light emitting duration. Taking notice of the peripheral speeds of the photosensitive drum 32 and the developing roller 46, for instance, the developing roller 46 rotates at a peripheral speed twice as high as that of the photosensitive drum 32 so that sufficient toner supply is ensured for the photosensitive drum 32 by increasing the peripheral speed of the developing roller 46. It is thus possible for the toner developing quantity to be varied also by varying the peripheral speed of the developing roller 46 with a fixed peripheral speed of the photosensitive drum 32. The above is the correction of the toner developing quantity through the variation of the drum peripheral speed ratio.

Figure 15:
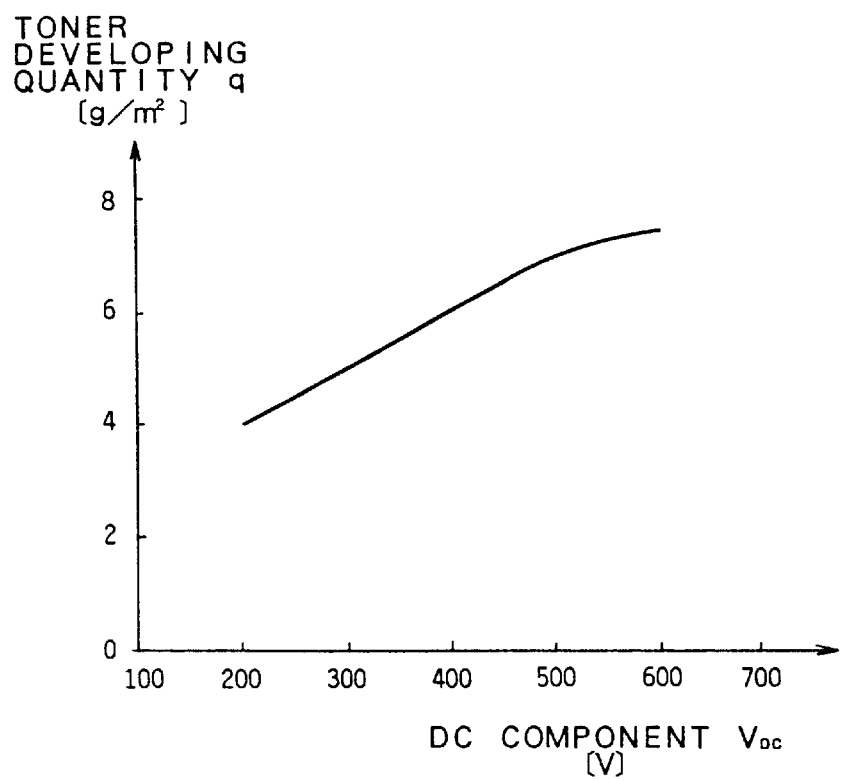
FIG. 15 is a characteristic diagram of the toner developing quantities relative to the developing bias DC components.

FIG. 15 shows the correlation of the toner developing quantity q relative to the developing bias DC component $V_{DC}$ by the toner developing quantity correction unit 128 of FIG. 6B. For instance, the developing bias DC component $V_{DC}$ may be controlled in the range from 200 to 600V so that the toner developing quantity can be controlled in the range of 4 to 7 [g/m$^2$].

Figure 16:
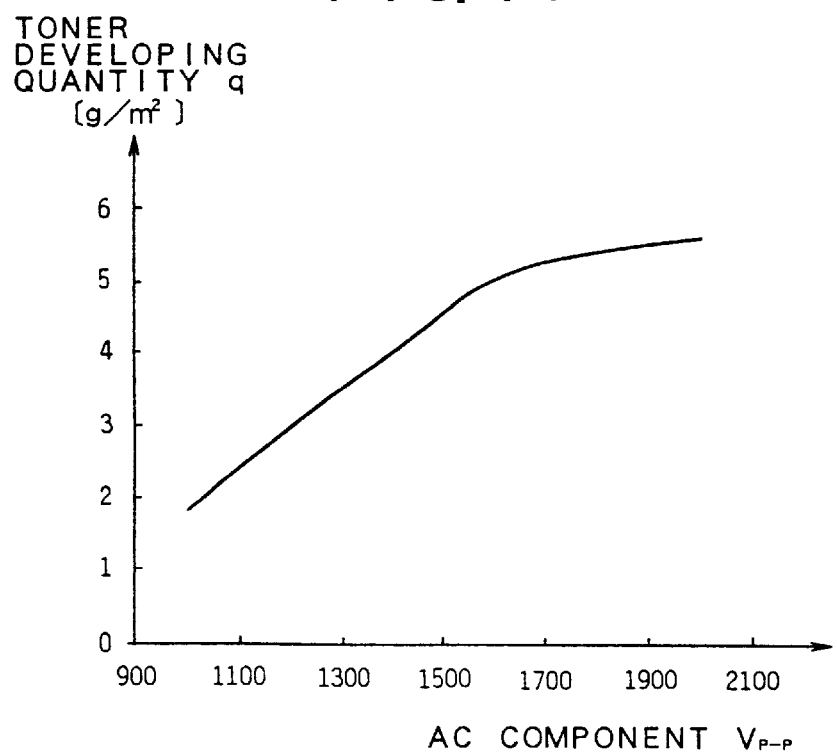
FIG. 16 is a characteristic diagram of the toner developing quantities relative to the developing bias AC components.

FIG. 16 shows the correlation of the developing quantity q relative to the peak value $V_{p-p}$ of the developing bias AC components, that is, AC voltages. Although FIG. 14C employs only the DC components as the developing bias by way of example, the AC components may be superimposed to this. In this case, it is possible to vary substantially linearly the developing quantity q in the range from 2 to 5 [g/m$^2$] with the AC component $V_{p-p}$ ranging from 1000 to 1600.

Figure 17:
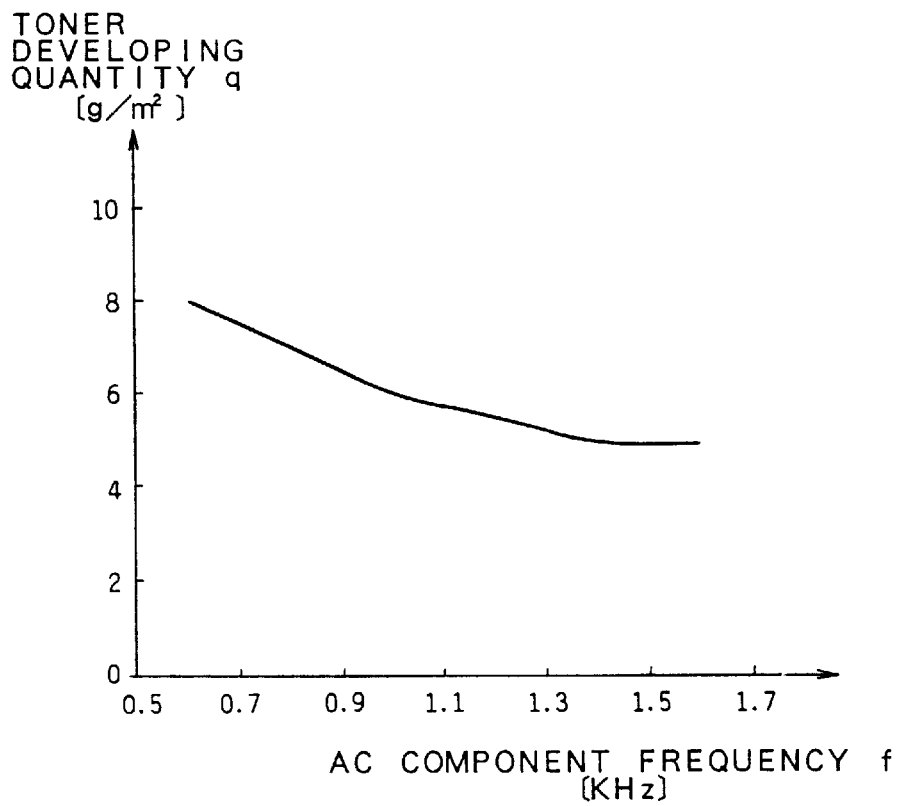
FIG. 17 is a characteristic diagram of the toner developing quantities relative to the developing bias AC component frequency.

FIG. 17 shows the correlation of the developing quantity q relative to the developing bias AC component frequency f. When the AC component frequency f is varied in the range, e.g., from 0.6 to 1.5 kHz, it is possible to obtain a variation of the developing quantity q in the range, e.g., from 8 to 5 [g/m$^2$] which is inversely proportional to the above frequency variation.

Figure 18:
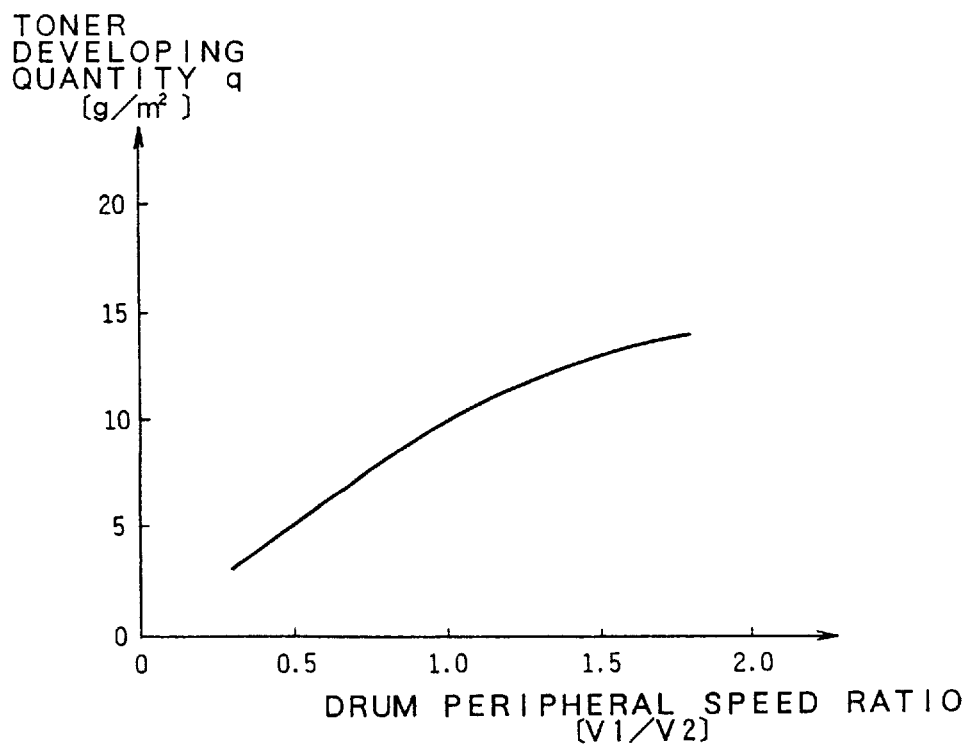
FIG. 18 is a characteristic diagram of the toner developing quantities relative to the peripheral speed ratio between the photosensitive drum and the developing drum.

FIG. 18 shows the correlation of the toner developing quantity relative to the drum peripheral speed ratio which is a peripheral speed ratio between the photosensitive drum and the developing roller. In this case, when the drum peripheral ratio is varied in the range of e.g., from 0.25 to 1.25 with a fixed speed V1 of the photosensitive drum 32 and with a variable speed V2 of the developing roller 46, it is possible to vary the toner developing quantity q in the range of 2.5 to 14 [g/m$^2$]. The variation of the toner developing quantity relative to the drum peripheral speed ratio results becomes larger by one digit as compared with the case of the developing bias shown in FIGS. 15 to 17.

Figure 19:
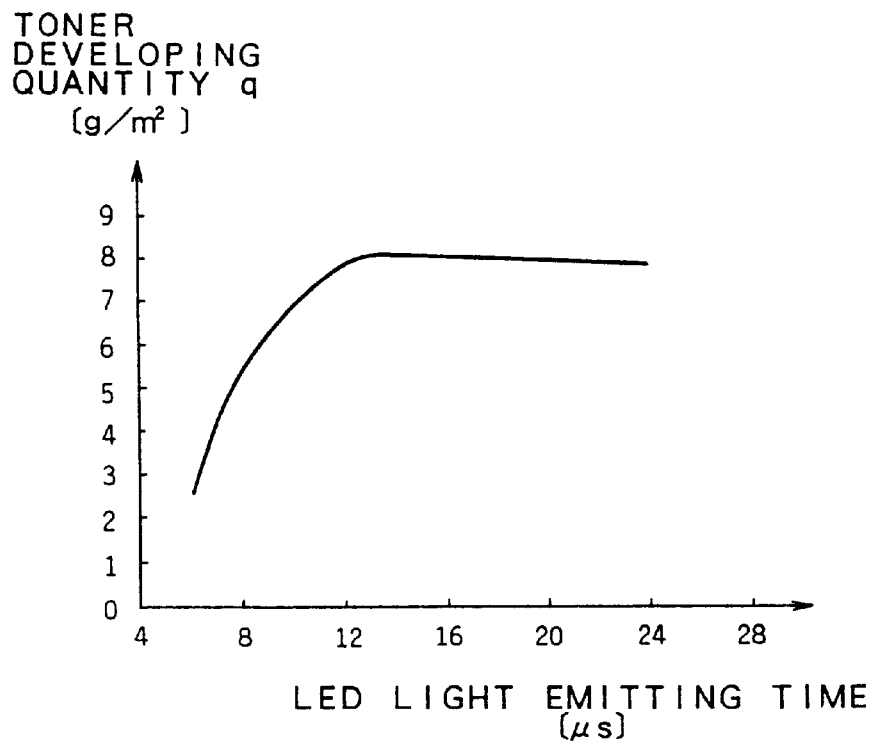
FIG. 19 is a characteristic diagram of the toner developing quantities relative to the LED light emitting time.
Figure 20:
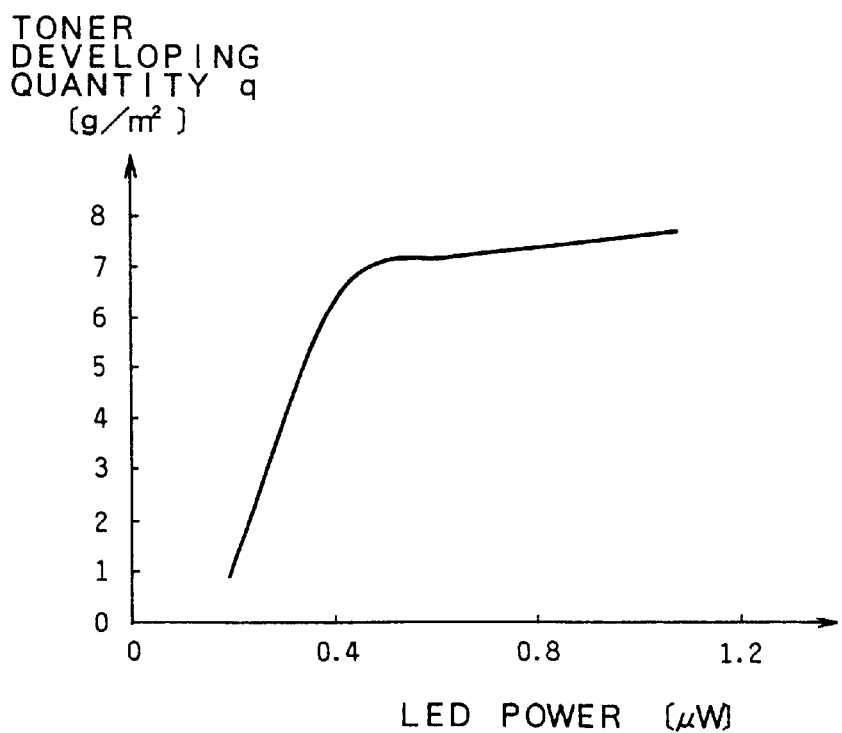
FIG. 20 is a characteristic diagram of the toner developing quantities relative to the LED light emitting power.

FIG. 19 shows the correlation of the toner developing quantity relative to the LED light emitting time, in which the toner developing quantity can vary substantially linearly in the range from 2.5 to 8 [g/m$^2$] with the light emitting time ranging from 6 to 12 [μs]. In addition, FIG. 20 shows the correlation of the toner developing quantity relative to the LED light emitting power, in which the toner developing quantity can vary substantially linearly in the range from 0.1 to 0.7 with a relatively low light emitting power ranging from 0.2 to 0.4 for instance.

Figure 21:
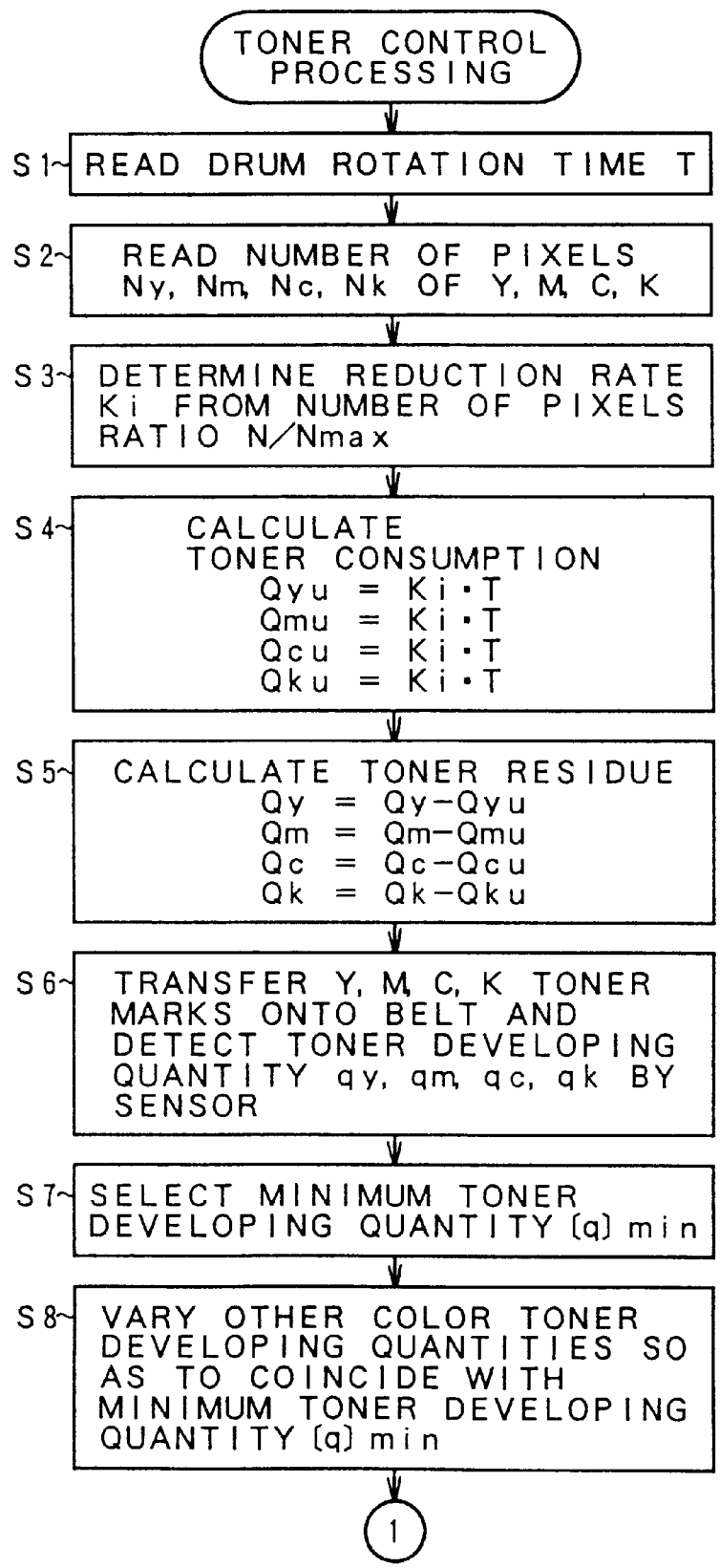
FIG. 21 is a flowchart of the toner control processing in accordance with the present invention.
Figure 22:
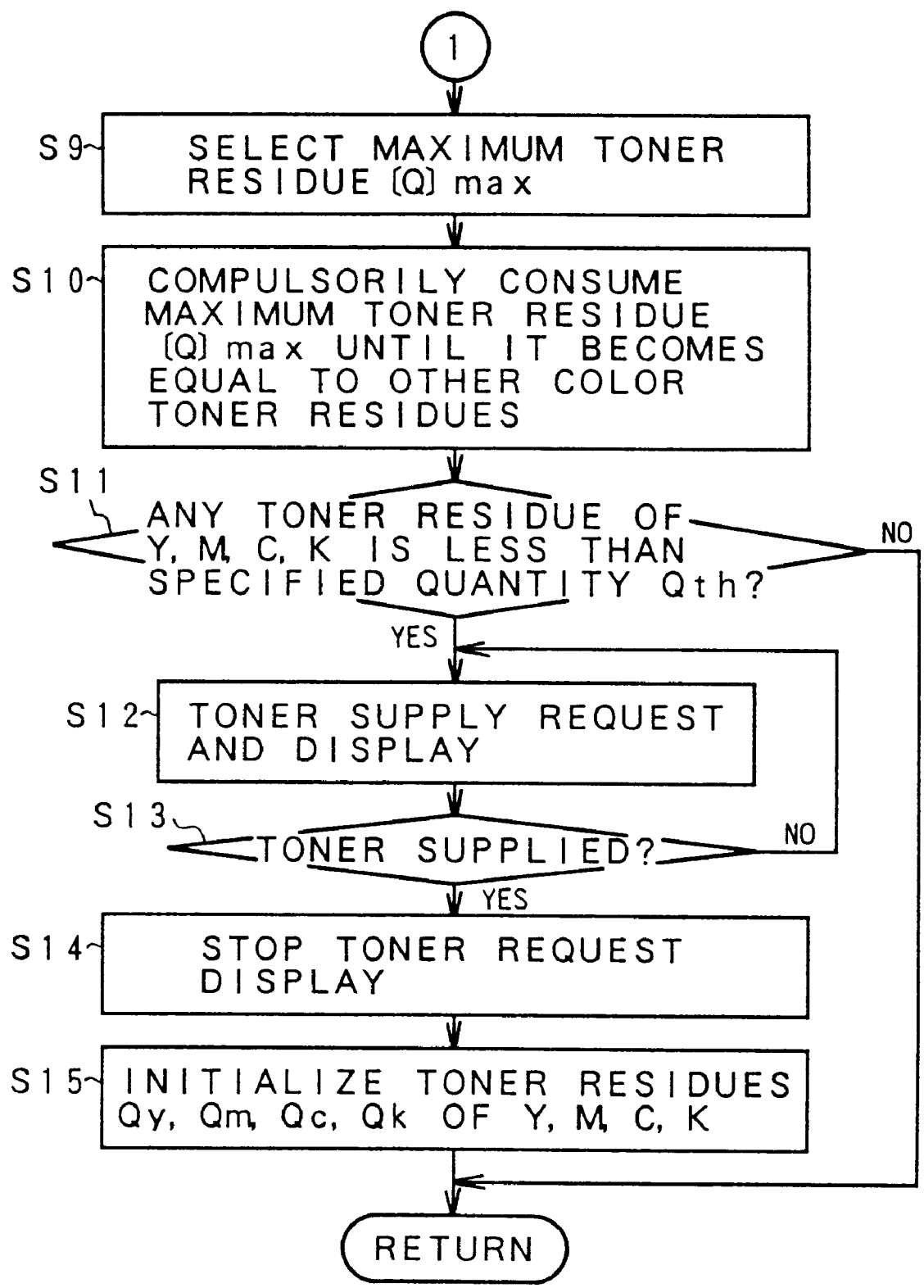
FIG. 22 is a flowchart of the toner control processing in accordance with the present invention (continued)

FIGS. 21 and 22 are a detailed flowchart of toner control processing in step S4 of FIG. 7, which is executed by the function of the MPU for sensor processing 66 of FIG. 6B. For this toner control processing, in step S1 there is read the drum rotation time T of the photosensitive drums of the Y, M, C and K electrostatic recording units 24-1 to 24-4 which has been measured in the print processing previous to the start of the toner control processing, and in step S2 there is read the print number-of-pixels Ny, Nm, Nc and Nk indicative of effective numbers from image data stored in the Y, M, C and K image memories 84-1 to 84-4 of the controller unit during the same print processing. Then in step S3, the maximum print number-of-pixels Nmax depending on the size of the print paper at that time is used to determine for instance a decreasing rate of the line, that is, an inclination Ki for obtaining the toner consumption relative to the drum rotation time T of FIG. 8, from the number-of-pixels ratio N/Nmax which is a ratio of the number-of-pixels N of Y, M, C and K which have been read in step S2 relative to the Nmax. After the determination of the coefficient Ki for obtaining the toner consumption relative to the drum rotation time T in this manner, the procedure goes to step S4 in which are calculated the toner consuming quantities Qyu, Qmu, Qcu and Qku of the Y, M, C, and K, respectively. Then in step S5, this time toner consuming quantities obtained in step S4 are subtracted from the last time calculated toner residues to obtain the current toner residues Qy, Qm, Qc and Qk. Then in step S6, the Y, M, C and K toner marks are transferred onto the belt and read by the sensor to detect the toner developing quantities qy, qm, qc and qk from the correlation of the Y, M, C and K toner developing quantities Q relative to the sensor output voltage as shown in FIG. 12 for instance. Then in step S7, the minimum toner developing quantity [q]min is selected from among the thus detected toner developing quantities. Then in step S8, the correction processing is carried out for varying the other color toner developing quantities so as to coincide with the thus selected minimum toner developing quantity [q]min. Through the detection of the toner developing quantities based on the transfer of the toner marks in the steps S6 to S8, the color toner developing quantities are corrected so as to coincide with the minimum toner developing quantity so that the toner residues in the Y, M, C and K electrostatic recording units 24-1 to 24-4 are controlled to be kept at substantially the same level throughout the operation of the printing apparatus, to consequently allow the toner residues to lie within similar residue ranges without any significant difference. Then the procedure advances to step S9 of FIG. 22, in which the maximum toner residue [q]max is selected from among the toner residues calculated in step S5 of FIG. 21. Then in step S10, the maximum toner residue [q]max is compulsorily consumed until it reaches substantially the same level as that of the other color toner residues. In this case, the color toner residue to be compulsorily consumed refers to the maximum residue beyond an error range which has been previously defined as the same residue range. Then in step S11, it is judged whether any one of the Y, M, C and K residues is not more than a predetermined specific quantity Qth. If any toner residue is not more than the specific quantity Qth, then in step S12 a toner supply request is displayed. Then the operator takes out the Y, M, C and K electrostatic recording units 24-1 to 24-4 as shown in FIG. 3, to replace the toner cartridges thereof with new ones. Once the toner cartridge replacement is executed in response to the toner supply request in this manner, it is judged in step S13 that the toner supply has been made, and the toner request display is stopped in step S14, after which in step S15 the Y, M, C and K toner residues are initialized to the capacity of the toner bottles, e.g., 600 g so that the toner residue control is resumed starting from the initial toner residue Qs of FIG. 8 upon the completion of the next print operation.

Although in the case of the toner control processing of FIGS. 21 and 22 the detection and correction of the toner developing quantities through the transfer of the toner marks onto the belt are carried out in steps S6 to S8 between the toner consumption calculation and the toner residue judgment, they may independently be performed as separate processing routines. Although in the flowchart of FIG. 7 the toner control processing is performed each time the print processing is complete in step S3, it may be performed by the initialization processing in step S1 upon the power on of the apparatus, or alternatively, a series of toner control processes may be performed in conformity with an instruction based on a command issued through the switching operation by the operator during the dwell period of the print processing, or on a command from the host apparatus.

Belt Position Adjustment Processing

FIG. 23 shows a detail of the belt position adjustment processing unit 142 provided in the mechanical controller 64 of FIG. 6. The belt position adjustment processing unit 142 comprises a belt motor 25 acting as a control load, a tension actuator 164 for adjusting the belt tension, a centering actuator 166 for displacing the belt in the direction orthogonal to its conveyance direction for position adjustment, and a position sensor 168 for detecting the centering position of the belt. In response to a receipt of a modification activation signal 145, it executes the belt position adjustment processing. As in step S5 of FIG. 7, the modification activation signal 145 is issued at the print operation stop timing after the completion of the print processing in step S3, to allow the belt position modification processing to be performed. The modification activation signal 145 is also issued upon the initialization processing of step S1 immediately after the power on of the apparatus, to allow the belt position to be modified. Otherwise, in order to allow the belt position to be modified, the modification activation signal 145 may be issued in response to the command through the switching operation by the operator or to the command from the host apparatus.

Figure 24:
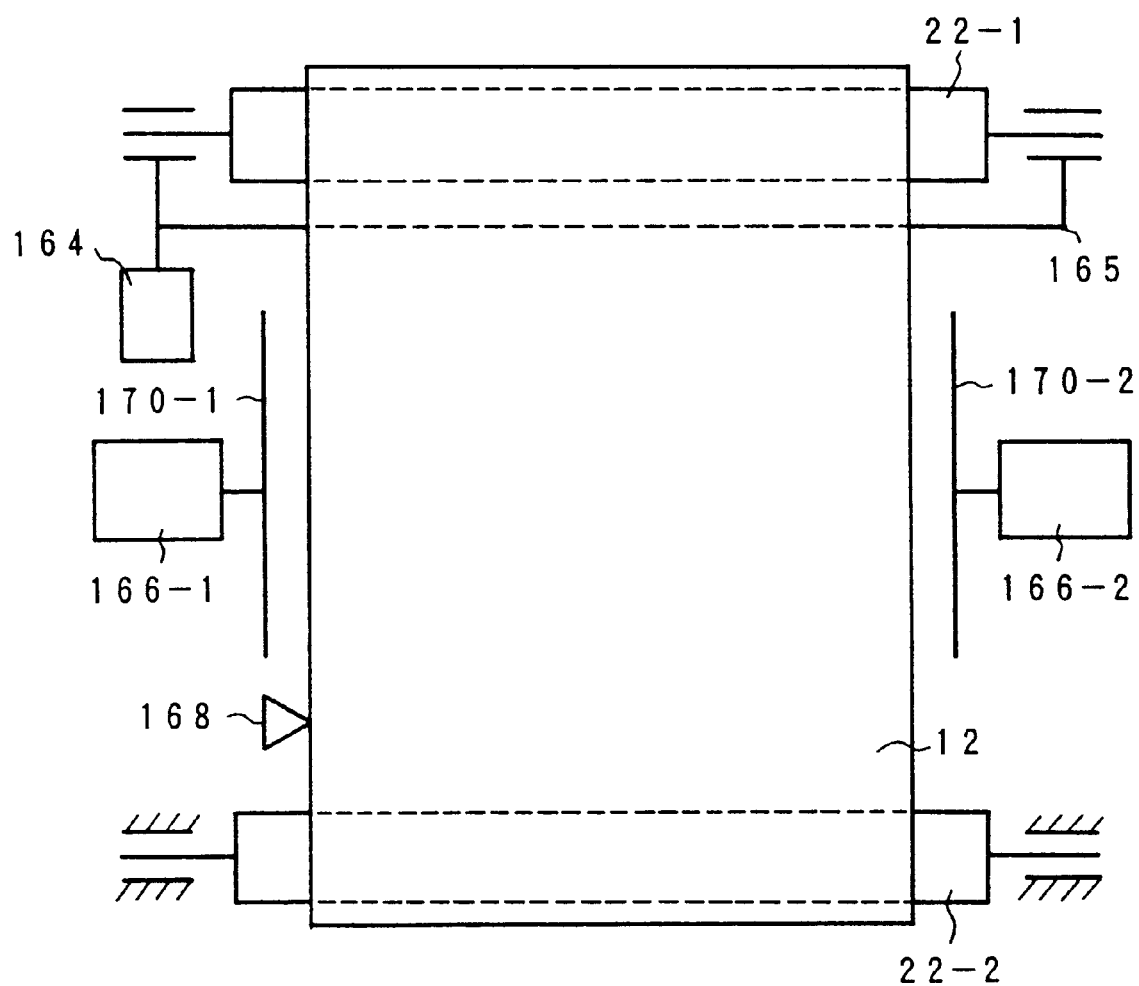
FIG. 24 is an explanatory diagram of an embodiment of a belt position adjustment mechanism.

FIG. 24 shows in a planar manner a mechanism configuration for position adjustment in the conveyance belt unit 11 under the control of the belt position adjustment processing unit 142 of FIG. 23. The endless belt 12 extends around the driving roller 22-1 and the driven roller 22-2. Upon the print operation the driving motor 22-1 is rotated by a belt drive motor not shown to allow the endless belt 12 to travel at a certain speed. In this embodiment, a link frame 165 couples together bearings at both sides of the driving roller 22-1 and the tension actuator 164 enables the driving roller 22-1 to be translated toward the driven roller 22-2, thereby making it possible for the tension applied to the endless belt 12 to be increased and decreased. Centering actuators 66-1 and 66-2 having guide plates 170-1 and 170-2 are arranged at both sides of the endless belt 12. In the case of the belt position adjustment processing unit 142 of FIG. 23, the tension actuator 164 is operated during the dwell period of the print operation to translate the driving roller 22-2 via the link frame 165 toward the driven roller 22-2 by a specific amount. This results in a reduced tension of the endless belt 12. With the reduced tension of the endless belt 12, the belt position adjustment processing unit 142 drives the belt drive motor 25 at a lower speed than that upon the print operation. In such a state where the endless belt 12 travels at a low speed with its reduced tension, the position sensor 168 reads the belt position. In cases where there is a deviation from the specific position to be centered, the centering actuator 166-1 or 166-2 is driven so as to eliminate the positional offset in the transverse direction of the belt. In cases where the endless belt 12 is offset to the right side for instance, the centering actuator 166-2 is driven to press the guide plate 170-2 against the right end of the endless belt 12 to force it leftward. As a result of this, the endless belt 12 is returned to its left-hand correct position so that the adjustment by the centering actuator 166-2 is released once the position sensor 168 has detected the centering position. After the completion of the position adjustment of the endless belt 12, the belt position adjustment processing unit 142 then eliminates the distortion such as deflection or offset which may occur in the endless belt 12 with the adjustment of the belt position. More specifically, the belt position adjustment processing unit 142 drives the tension actuator 164 linearly from the adjustment state to increase the tension of the endless belt 12 while simultaneously rotating the belt driving motor 25 to increase the speed from the adjustment speed to a speed slightly lower than the specific speed at the time of the print operation, thereby performing the adjustment processing for eliminating the distortion applied to the endless belt 12 during the adjustment, after which it is stopped to wait for the next print operation.

Figure 25:
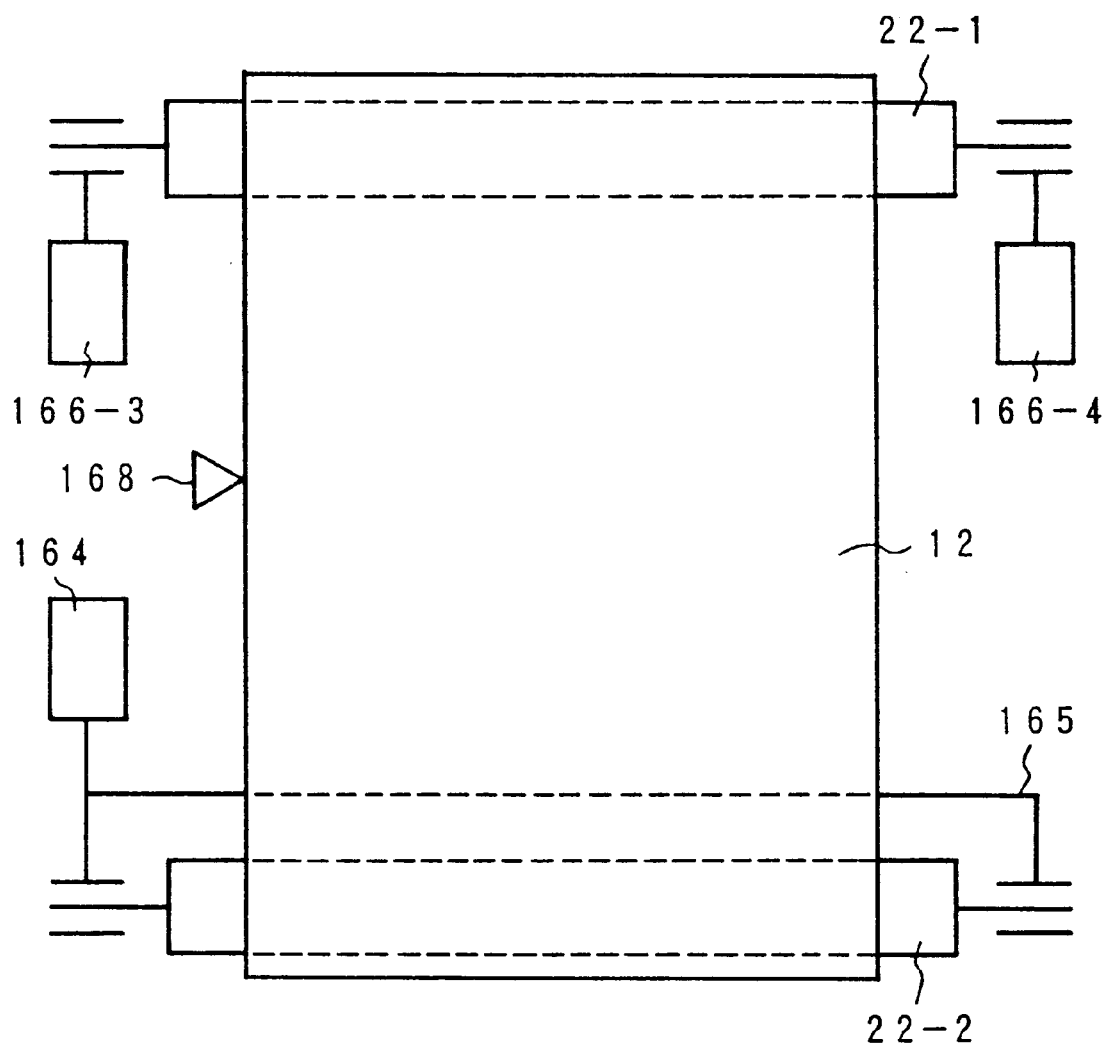
FIG. 25 is an explanatory diagram of another embodiment of the belt position adjustment mechanism.

FIG. 25 shows another embodiment of the conveyance belt unit 11 enabling the belt position adjustment under the control of the belt position adjustment processing unit 142 of FIG. 23. In this embodiment the tension actuator 164 for adjusting the tension is disposed by way of the link frame 165 on the driven roller 22-2 side. On the contrary, centering actuators 166-3 and 166-4 are disposed independently on the right and left bearings of the driving roller 22-1.

Figure 26:
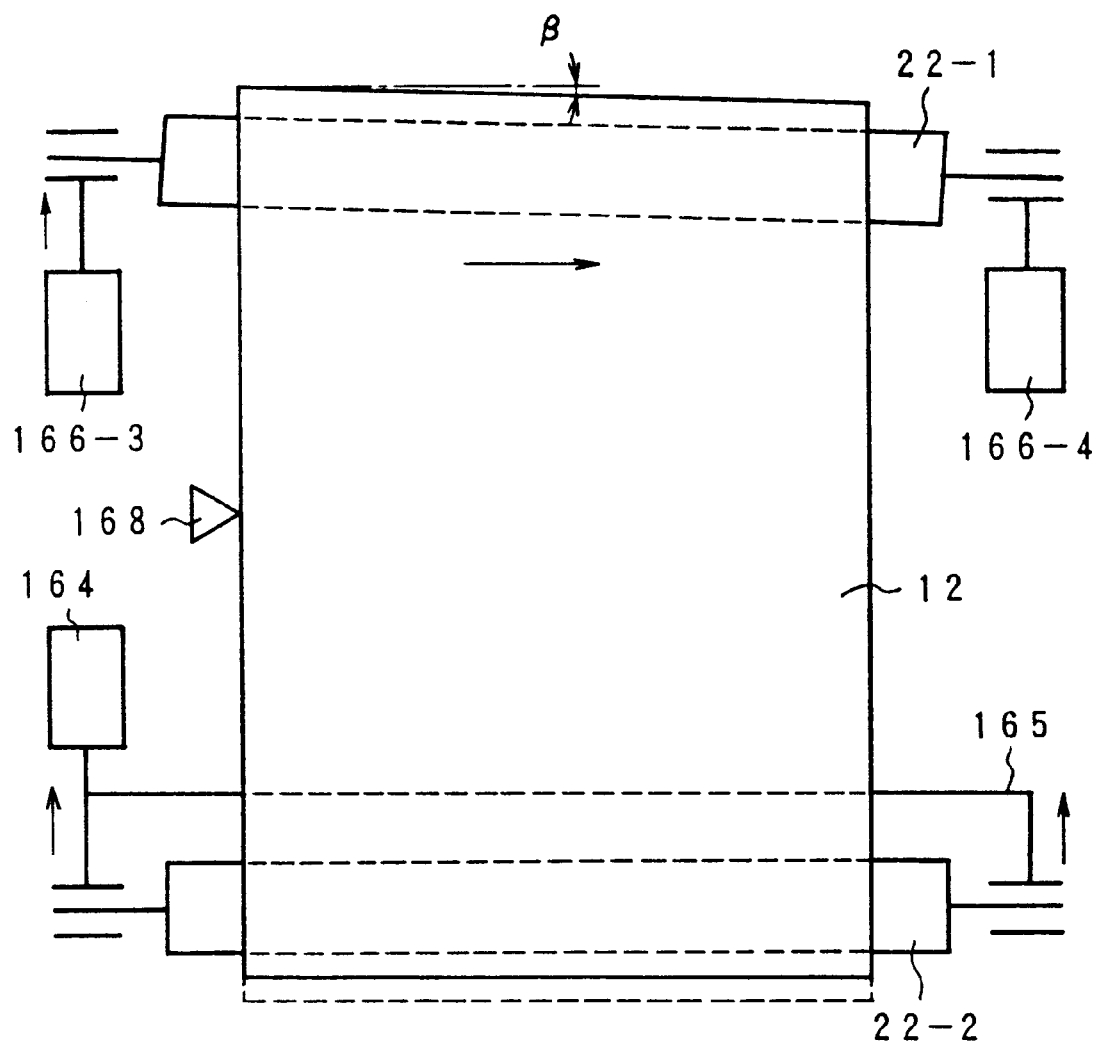
FIG. 26 is an explanatory diagram of the state of the action for adjusting the position of the belt rightward by the adjustment mechanism of FIG. 25.

FIG. 26 is an explanatory diagram of the belt position adjustment by the centering actuators 166-3 and 166-4 provided on the driving roller 22-1 in the embodiment of FIG. 25. In this belt position adjustment, the left-hand centering actuator 166-3 is driven to offset the rotational axis of the driving roller 22-1, to locate the roller at a leftward raising inclination angle β. By tilting the driving roller 22-1 by the inclination angle β, there occurs a tension causing the endless belt 12 to move rightward. Thus, when the endless belt 12 is rotated in this state, the endless belt 12 is allowed to move rightward, that is, toward the inclining direction of the tilted driving roller 22-1.

Figure 27:
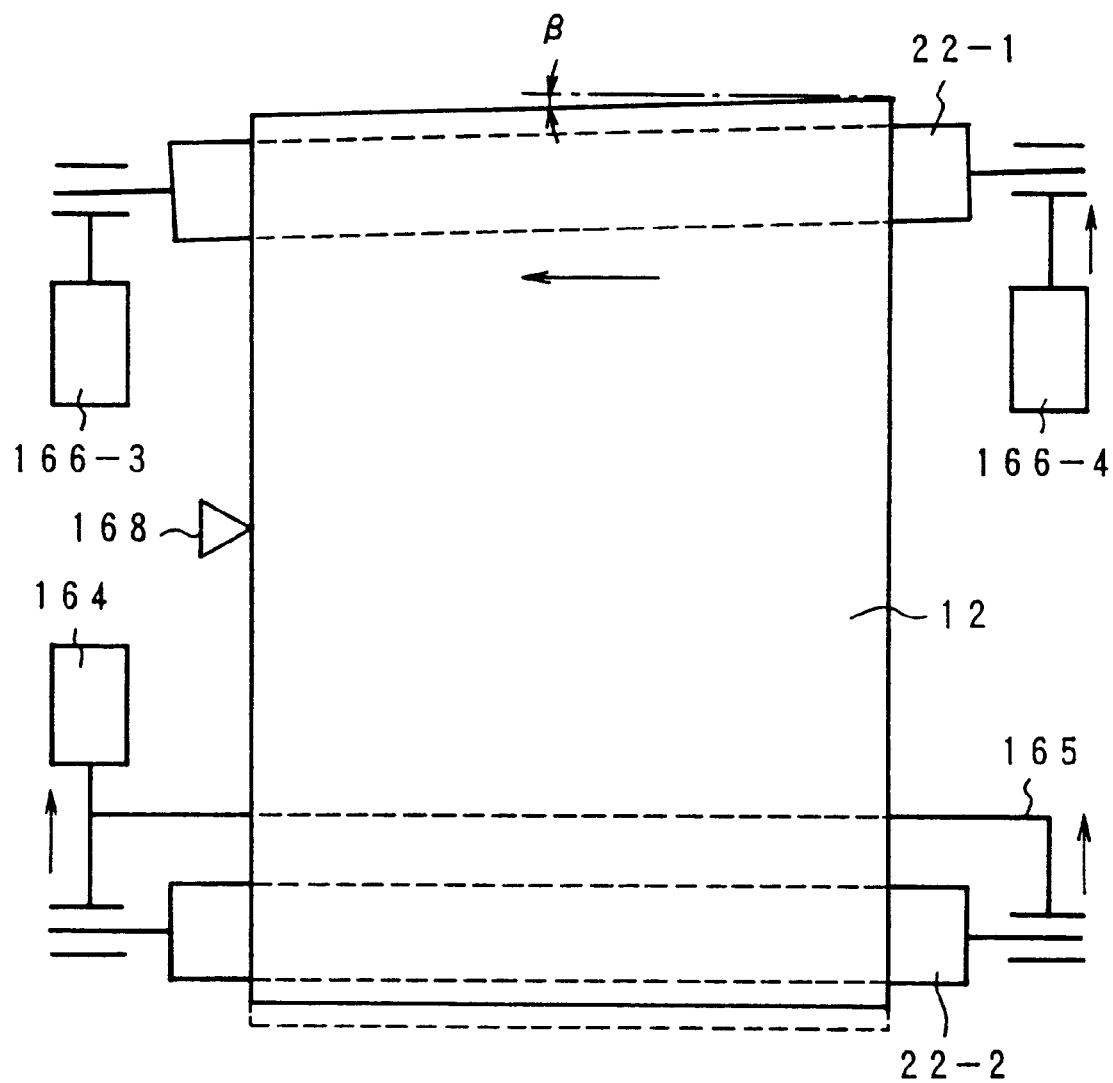
FIG. 27 is an explanatory diagram of the state of the action for adjusting the position of the belt leftward by the adjustment mechanism of FIG. 25.

FIG. 27 shows a case where the right-hand tension actuator 166-4 of FIG. 25 is operated to tilt the driving roller 22-1 clockwise to locate the roller at an opposite inclination angle β. In this case, there occurs a tension causing the endless belt 12 leftward to thereby make it possible for the endless belt 12 to move leftward by the drive of the belt. It is naturally to be appreciated that the configuration of the mechanism for the belt position adjustment of the present invention is not limited to that of FIGS. 24 and 25, and that any appropriate configuration of the mechanism could be employed as long as it has capabilities to increase and reduce the tension and to move the belt in the transverse direction.

Figure 28:
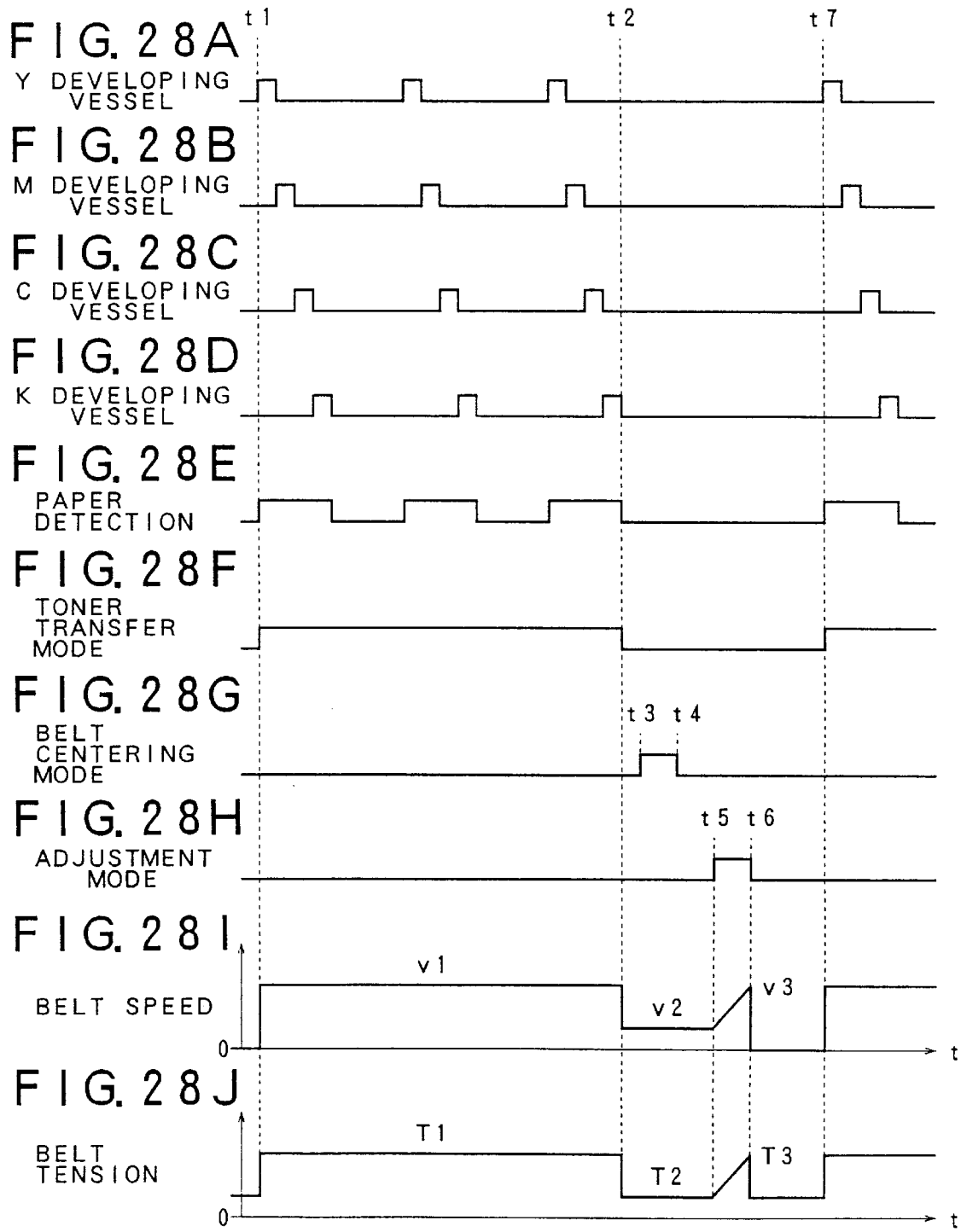
FIGS. 28A to 28J are timing charts of the belt position adjustment processing of FIG. 24.

FIGS. 28A to 28J are timing charts of the belt position adjustment processing executed by the belt position adjustment processing unit 142 of FIG. 23. FIGS. 28A to 28D illustrate the action of the developing vessel provided in the Y, M, C and K electrostatic recording units 24-1 to 24-4, and FIG. 28E illustrates the detection of the papers conveyed by the conveyance belt unit. In these timing charts, three papers are fed in sequence during the time t1 to t2 and are subjected one by one in sequence to the transfer of the Y, M, C and K color toners of FIGS. 28A to 28D. During the print period from time t1 to t2, the toner transfer mode becomes high level, that is, effective as shown in FIG. 28E, whereas upon the completion of the print processing at time t2 the toner transfer mode becomes low level, that is, off, thus providing the dwell state of the print operation. In the dwell period at time t2 when the toner transfer mode is released, the belt centering mode is set during the period time t3 to t4 as shown in FIG. 28G. This belt centering mode allows the belt speed to be controlled to a speed v2 lower than the speed v1 in the toner transfer mode during the time t1 to t2 as shown in FIG. 28I. The belt tension of FIG. 28J is also lowered to a tension T2 lower than the tension T1 in the toner transfer mode for print operation. In the state where the belt speed has been lowered to v2 and the tension has been reduced to T2, the position adjustment is carried out for centering the endless belt 12 by the adjustment mechanism provided in the conveyance belt unit 11 of FIG. 24 or 25 during the period t3 to t4 of the belt centering mode of FIG. 28G. After the completion of the position adjustment at time t4, the adjustment mode is then provided during the time t5 to t6 as shown in FIG. 28H. In this adjustment mode, the belt speed is increased linearly from the speed v2 at the time of the position adjustment to a speed v3 slightly lower than the speed v1 at the print operation as shown in FIG. 28I. In connection to this increase of the belt speed, the belt tension of FIG. 28J is also increased linearly from the belt tension T2 at the time of the belt position adjustment up to the tension T3 slightly lower than the belt tension T1 at the print operation. By virtue of the rotational drive of the belt with gradually increasing belt speed and belt tension, there is adjusted the belt deflection which may occur through the belt position adjustment and the state of contact with the roller, to make it possible to eliminate the distortion attributable to the adjustment. After the completion of the belt position adjustment and the distortion elimination adjustment, a next print request is again issued at time t3 to perform the print operation.

Figure 29:
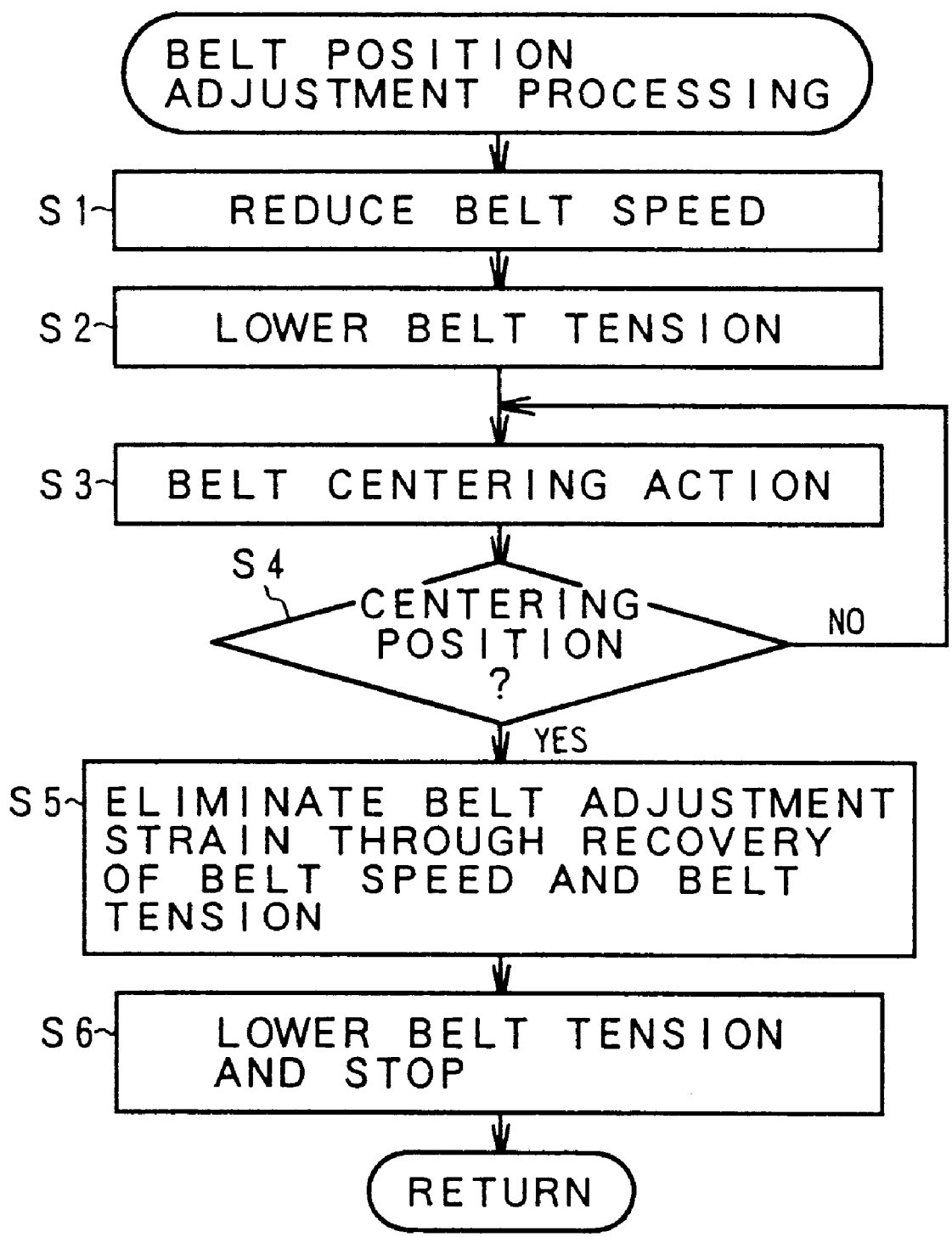
FIG. 29 is a flowchart of the belt position adjustment processing of FIG. 24.

FIG. 29 is a flowchart of the processing action of the belt position adjustment processing unit 142. When a modification activation signal 145 is received during the dwell period of the print operation, the belt speed is reduced in step S1, and simultaneously the belt tension is also lowered in step S2. Then in step S3 a belt centering action is performed for adjusting the belt to its specific centering position and in step s4 the adjustment processing is repeated until the centering position is detected by the position sensor. After the completion of the positional adjustment to center the belt, in step S5 the belt adjustment distortion is eliminated through the recovery of the belt speed and the belt tension, after which in step S6 the belt is stopped with the belt tension reduced and then the procedure goes back to the main routine of FIG. 7 to wait for the next print request.

According to the present invention as hereinbefore described, even though the consuming quantities of the different color toners of Y, M, C and K have been varied due to the types of the print images or to the unevenness in the toner developing quantities, the consuming quantities of the color toners are always controlled to be the same level throughout the operation of the apparatus, so that in cases where the residue of a specific color toner has been reduced to the specified value or below resulting in a need for toner replacement, the other color toners also remain at substantially the same level, with the result that there is little waste in spite of the replacement of all the color toner cartridges with new ones.

By virtue of the replacement of all the color toner cartridges effected in response to the request for replacement of a specific color toner, there can be overcome a problem, which would occur if only the specific color toner was replaced with new one, that the toner replacement work becomes complicated since another color toner replacement request may be issued after the elapse of a short period of time.

Furthermore, due to the configuration allowing the detection of the toner developing quantities through the actual transfer of the toner marks and the selection of the minimum developing quantity from among the detected toner developing quantities in order to correct the toner developing quantities of the other color toner components so as to coincide with the minimum developing quantity, it is possible for the consuming quantities of the other color toners to be controlled to coincide with the minimum toner consumption, thereby enabling the replacement life of the entire color toners to be elongated.

Furthermore, in the present invention, due to the provision of the adjustment function for adjusting the belt to the centering position during the print dwell period, there is no need to provide a mechanism for mechanically preventing the positional offset of the belt, thereby ensuring a secure prevention of the breakage attributable to a belt positional offset which may occur upon the execution of mechanical anti-positional offset measures, thus realizing a stabilized operation of the printing apparatus over the long period of time.

Although the above embodiments have been applied by way of example to the printing apparatus which is connected in use to the word processor or personal computer, they are applicable intactly to any appropriate apparatus as long as it is a multi-color electrostatic recording apparatus using the electrostatic recording units in tandem arrangement to transfer a plurality of color toners onto the papers. It is to be appreciated that the present invention is not limited to the above embodiments and that it can be modified appropriately without departing the object thereof. It is also appreciated that the present invention is not restricted by the numerical values indicated in the embodiments.

What is claimed is:

1. A printing apparatus comprising:
   a belt conveyance mechanism for conveying record papers at a certain speed;
   a plurality of electrostatic recording units arranged in a direction in which said record papers are conveyed, to optically scan a photosensitive drum in rotation to form thereon latent images in conformity with image data, to develop them with toner components having different colors and thereafter transfer them onto said record papers laying on a belt;
   a toner mark transfer unit for transferring toner marks of color components onto said belt by means of said plurality of electrostatic recording units;
   a toner developing quantity detection unit for detecting toner developing quantity per unit area of each color toner, on the basis of detection signals from a sensor which has optically detected said toner marks of color components on said belt; and
   a toner developing quantity correction unit for correcting, on the basis of said detected toner developing quantities, toner developing quantities so as to allow toner consuming quantities of said plurality of electrostatic recording units to be substantially the same level.

2. A printing apparatus according to claim 1, wherein said toner developing quantity correction unit selects the minimum developing quantity from among said toner developing quantities of color components detected by said toner developing quantity detection unit, and corrects said toner developing quantities of the other color components so as to coincide with said minimum developing quantity.

3. A printing apparatus according to claim 2, wherein said toner developing quantity correction unit varies a DC component voltage of a developing bias voltage being applied to a developing roller of each of said electrostatic recording units, to thereby correct the toner developing quantities.

4. A printing apparatus according to claim 2, wherein said toner developing quantity correction unit varies an AC component voltage of a developing bias voltage being applied to a developing roller of each of said electrostatic recording units, to thereby correct the toner developing quantities.

5. A printing apparatus according to claim 2, wherein said toner developing quantity correction unit varies an AC component frequency of a developing bias voltage being applied to a developing roller of each of said electrostatic recording units, to thereby correct the toner developing quantities.

6. A printing apparatus according to claim 2, wherein said toner developing quantity correction unit varies a ratio of peripheral speed between said photosensitive drum and a developing roller in each of said electrostatic recording units, to thereby correct the toner developing quantities.

7. A printing apparatus according to claim 2, wherein said toner developing quantity correction unit varies an emitting time of light of an LED array provided in each of said electrostatic recording units, to thereby correct the toner developing quantities.

8. A printing apparatus according to claim 2, wherein said toner developing quantity correction unit varies an emitting power of light of an LED array provided in each of said electrostatic recording units, to thereby correct the toner developing quantities.

9. A printing apparatus according to claim 1, further comprising:

a toner consuming quantity detection unit for detecting toner consuming quantities upon a print operation in said plurality of electrostatic recording units; and a toner residue control unit for obtaining current toner residues on the basis of said toner consuming quantities, to issue a request for toner supply when said current toner residues have lowered to a specified value or below.

10. A printing apparatus according to claim 9, wherein said toner consuming quantity detection unit calculates a toner consuming quantity Q on the basis of a rotation time T of said photosensitive drum provided in each of said plurality of electrostatic recording units and on a number-of-pixels N of print information per sheet.

11. A printing apparatus according to claim 10, wherein said toner consuming quantity detection unit obtains a reduction rate K of the toner consuming quantity relative to the drum rotation time T from a ratio (N/Nmax.) of said number-of-pixels N of print information per sheet relative to a full number-of-pixels Nmax which is determined by paper size and resolution, and calculates the toner consuming quantity Q for each color component in conformity with said reduction rate K.

12. A printing apparatus according to claim 9, further comprising:

a toner compulsory consumption unit for compulsorily consuming a maximum toner residue of color components obtained by said toner residue control unit in associated said electrostatic recording unit, to thereby correct said maximum toner residue so as to be substantially the same level as that of toner residues of the other color components.

13. A printing apparatus according to claim 9, wherein said detection and correction of said toner developing quantities is carried out upon the turning on of power, upon start of a printing job after the power on, and upon reception of a correction instruction through a command or a switching operation.

* * * * *